(12) United States Patent
Sarraf et al.

(10) Patent No.: US 10,756,811 B2
(45) Date of Patent: Aug. 25, 2020

(54) METHOD AND SYSTEM FOR A LOCATION DETERMINATION USING BI-MODAL SIGNALS

(71) Applicants:Mohsen Sarraf, Rumson, NJ (US); Xiaopeng Huang, Tinton Falls, NJ (US); Walid Khairy Mohamed Ahmed, Eatontown, NJ (US)

(72) Inventors: Mohsen Sarraf, Rumson, NJ (US); Xiaopeng Huang, Tinton Falls, NJ (US); Walid Khairy Mohamed Ahmed, Eatontown, NJ (US)

( * ) Notice: Subject to any disclaimer, the term of this patent is extended or adjusted under 35 U.S.C. 154(b) by 0 days.

(21) Appl. No.: 15/942,350

(22) Filed: Mar. 30, 2018

(65) Prior Publication Data

US 2019/0081698 A1 Mar. 14, 2019

Related U.S. Application Data

(63) Continuation-in-part of application No. 15/700,130, filed on Sep. 10, 2017, now abandoned.

(51) Int. Cl.
| | |
|---|---|
| *H04B 7/24* | (2006.01) |
| *G01S 11/16* | (2006.01) |
| *G01S 1/00* | (2006.01) |
| *H04B 10/112* | (2013.01) |
| *H04B 11/00* | (2006.01) |
| *H04B 10/00* | (2013.01) |

(52) U.S. Cl.
CPC .................. *H04B 7/24* (2013.01); *G01S 1/00* (2013.01); *G01S 11/16* (2013.01); *H04B 10/112* (2013.01); *H04B 10/00* (2013.01); *H04B 11/00* (2013.01)

(58) Field of Classification Search
CPC .... H04B 1/71632; H04B 1/7183; H04B 7/24; H04B 10/00; H04B 11/00; G01S 1/00; G01S 11/16
See application file for complete search history.

(56) References Cited

U.S. PATENT DOCUMENTS

| | | | |
|---|---|---|---|
| 3,555,189 | A | 1/1971 | Quatse |
| 3,706,982 | A | 12/1972 | Gehman |
| 3,709,084 | A | 1/1973 | Stobaugh |
| 3,726,334 | A | 4/1973 | Sallberg et al. |
| 3,727,216 | A | 4/1973 | Antonio |
| 3,727,822 | A | 4/1973 | Umbaugh |
| 3,735,323 | A | 5/1973 | Marscher et al. |
| 3,740,532 | A | 6/1973 | Esch |

(Continued)

*Primary Examiner* — Nhan T Le
(74) *Attorney, Agent, or Firm* — Patrick Reilly

(57) ABSTRACT

A target receives two signals of different modes in association with a first location and another two signals in association with a second location. The first two signals are assumed to have been emitted effectively simultaneously from the first location, and the second two signals are assumed to have been emitted effectively simultaneously from the second location. A first distance is calculated in view of a receipt time difference of the first two signals in view of differing rates of propagation assumed between these two signals; a second distance is calculated in view of another receipt time difference of these second two signals in view of differing rates of propagation assumed between each of these other signals. A possible location of the target is then calculated in view of the first distance and its associated first location and the second distance and its associated second location.

22 Claims, 24 Drawing Sheets

(56) References Cited

U.S. PATENT DOCUMENTS

| | | |
|---|---|---|
| 3,836,949 A | 9/1974 | Ergon |
| 4,235,153 A | 11/1980 | Rinde et al. |
| 4,361,060 A | 11/1982 | Smyth |
| 4,523,472 A | 6/1985 | Blades |
| 4,766,988 A | 8/1988 | Seibert |
| 5,186,175 A | 2/1993 | Hirama et al. |
| 5,194,684 A | 3/1993 | Lisle et al. |
| 5,477,859 A | 12/1995 | Engeler |
| 5,517,996 A | 5/1996 | Okada et al. |
| 5,953,694 A | 9/1999 | Pillekamp |
| 6,005,954 A | 12/1999 | Weinfurtner |
| 6,158,288 A | 12/2000 | Smith |
| 6,194,901 B1 | 2/2001 | Carton et al. |
| 6,477,140 B1 | 11/2002 | Uda et al. |
| 6,821,251 B2 | 11/2004 | Alexandru |
| 7,525,050 B1 * | 4/2009 | Weaver ................ G06F 3/0433 178/18.04 |
| 7,573,397 B2 | 8/2009 | Petrovic et al. |
| 7,764,601 B2 | 7/2010 | Murai |
| 8,451,120 B2 | 8/2013 | Johnson, Jr. et al. |
| 9,005,263 B2 | 4/2015 | Boyden et al. |
| 9,104,788 B2 | 8/2015 | Friedman et al. |
| 9,430,938 B2 | 8/2016 | Proud |
| 9,754,229 B2 | 9/2017 | Romanoff et al. |
| 10,063,369 B1 * | 8/2018 | Murphy ................ H04L 7/04 |
| 2002/0000916 A1 * | 1/2002 | Richards ............... G01S 5/0036 340/572.1 |
| 2002/0021468 A1 | 2/2002 | Kato et al. |
| 2002/0030596 A1 * | 3/2002 | Finn ................... H04B 1/7183 340/572.1 |
| 2009/0015096 A1 | 12/2009 | Puskas |
| 2013/0113336 A1 | 5/2013 | Spigelmyer et al. |
| 2017/0019525 A1 * | 1/2017 | Hannon ............ H04M 1/72577 |

* cited by examiner

METHOD AND SYSTEM FOR A LOCATION DETERMINATION USING BI-MODAL SIGNALS

CO-PENDING PATENT APPLICATION

This Nonprovisional patent application is a Continuation-in-Part Application to U.S. Nonprovisional patent application Ser. No. 15/700,130 titled "Method and Apparatus for a Wireless Charging and Communication System" as filed on Sep. 10, 2017 by Inventors Walid Khairy Mohamed Ahmed, Mohsen Sarraf, and Xiaopeng Huang. This Nonprovisional patent application claims benefit of the priority date of Sep. 10, 2017 of said U.S. Nonprovisional patent application Ser. No. 15/700,130. Furthermore, said U.S. Nonprovisional patent application Ser. No. 15/700,130 is incorporated in its entirety and for all purposes into this present Nonprovisional patent application.

TECHNICAL FIELD

The present invention relates to communication circuits, systems and methods. More particularly, the present invention relates to circuits that employ sound wave, mechanical vibration, and/or electromagnetic wave energy to transfer information.

BACKGROUND

Electromagnetic wave energy, such as radio frequency (RF) waves and light, has been widely used to transmit information-bearing signals, but can be easily intercepted. The prior art further includes the transmission of information bearing signals in the mode of sound waves (such as acoustic waves and ultrasonic waves), pressure waves, or other types of mechanical vibrations with piezoelectric transducers. Compared to electromagnetic wave energy, sound wave energy is optimal for signal transmission in certain environments. For example, sound wave can pass through a Faraday cage. Also, certain types of sound waves, such as ultrasonic waves and acoustic waves, have a very limited propagation range, and thus make the interception of signal outside such a short propagation range impossible. However, no optimal combination of both forms of communications have been established. Therefore, there is a long-felt need for circuits, systems and methods that utilize either or both electromagnetic wave energy and pressure wave energy, e.g., sound wave energy, to receive and/or generate information bearing signals or information encoded signals optionally in combination with transmissions of electromagnetic energy and/or pressure wave energy.

In addition, different sound wave transducing media have different characteristics. There is also a long-felt need for circuits, systems and methods that enable transmission of signals in the form of pressure wave energy, e.g., sound wave energy and/or electromagnetic energy in a complex environment that is composed of multiple components and optionally with pressure wave energy conducting medium or media. The present invention is offered to meet these two stated objects and other objects that are made obvious in light of the present disclosure.

SUMMARY AND OBJECTS OF THE PRESENT INVENTION

This Summary is provided to introduce a selection of concepts in a simplified form that are further described below in the Detailed Description. This Summary is not intended to identify key features or essential features of the claimed subject matter, nor is this Summary intended to be used to limit the scope of the claimed subject matter.

Described embodiments provide hybrid communicator circuits, systems, and methods. It is understood that sound waves travel in air at sea level in dry air at 20° C. (68° F.) at a speed of approximately 343 meters/second, while electromagnetic waves travel at the speed of light of 300,000,000 meters/second. While pressure waves need something to move in e.g., air or water, electromagnetic waves can travel in a vacuum. In one embodiment, a target device receives a first vibrational signal and a first electromagnetic signal that are each associated with a same nominal first location coordinate value; the target device may also receive a second vibrational signal and a second electromagnetic signal that are each associated with a same nominal second location coordinate value; a first distance value is derived in view of (a.) signal propagation speed differences imputed to the first vibrational signal and the first electromagnetic signal, and (b.) times of detection of each signal by the target device; a second distance value is derived in view of (a.) signal propagation speed differences imputed to the second vibrational signal and the second electromagnetic signal, and (b.) times of detection of each signal by the target device. One or two target device coordinate values of the target device may then be derived in view of (a.) the first distance value, (b.) the nominal first location coordinate value, (c.) the second distance value, and (d.) the nominal second location coordinate value.

Certain alternate preferred embodiments of the method of the present invention include one or more of the aspects of (1.) the target device transmitting the times of detection of one or more energy signals; (2.) the target device transmitting a measure of a time difference of receipt of an electromagnetic system and a vibrational signal; (3.) the target device calculating a distance value derived a time difference of receipt of an electromagnetic system and a vibrational signal; (4.) the target device calculating at least one target system coordinate value; (5.) the target device calculating two target system coordinate values; (6.) the target device transmitting at least one target system coordinate value; (5.) a device external (hereinafter, "the external device") to the target device receiving information from the target device; (6.) the external device receiving a time difference of signal receipt from the target device; (7.) the external device calculating the first distance value; (8.) the external device calculating the second distance value; (9.) the external device calculating the first distance value; and (8.) the external device deriving one or two target device coordinate values of the target device in view of information transmitted generated by the target device.

Various alternate preferred embodiments of the invented method employ more than one transducer to simultaneously or near-simultaneously send and/or receive information bearing pressure wave signals.

BRIEF DESCRIPTION OF THE DRAWINGS

These, and further features of the invention, may be better understood with reference to the accompanying specification and drawings depicting the preferred embodiment, in which.

Element numbers referenced in the text are provided in the Figures.

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events, which are logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It is understood that the numerical designation of "N", "N" or "NN" is herein meant to indicate that the quantity of individual elements of a plurality of a certain type of element, may be arbitrarily large and as required by a particular embodiment of the invented method. It is further understood that the numerical designation of "N", "N" or "NN" is not meant to indicate that different series of distinguishable instances of particular devices, systems, servers, or data types are of a same quantity of occurrences, but rather that each series referred to as having N or NN members or instances may be arbitrarily large and as required by a particular application or embodiment of the invented method.

Figure 1:
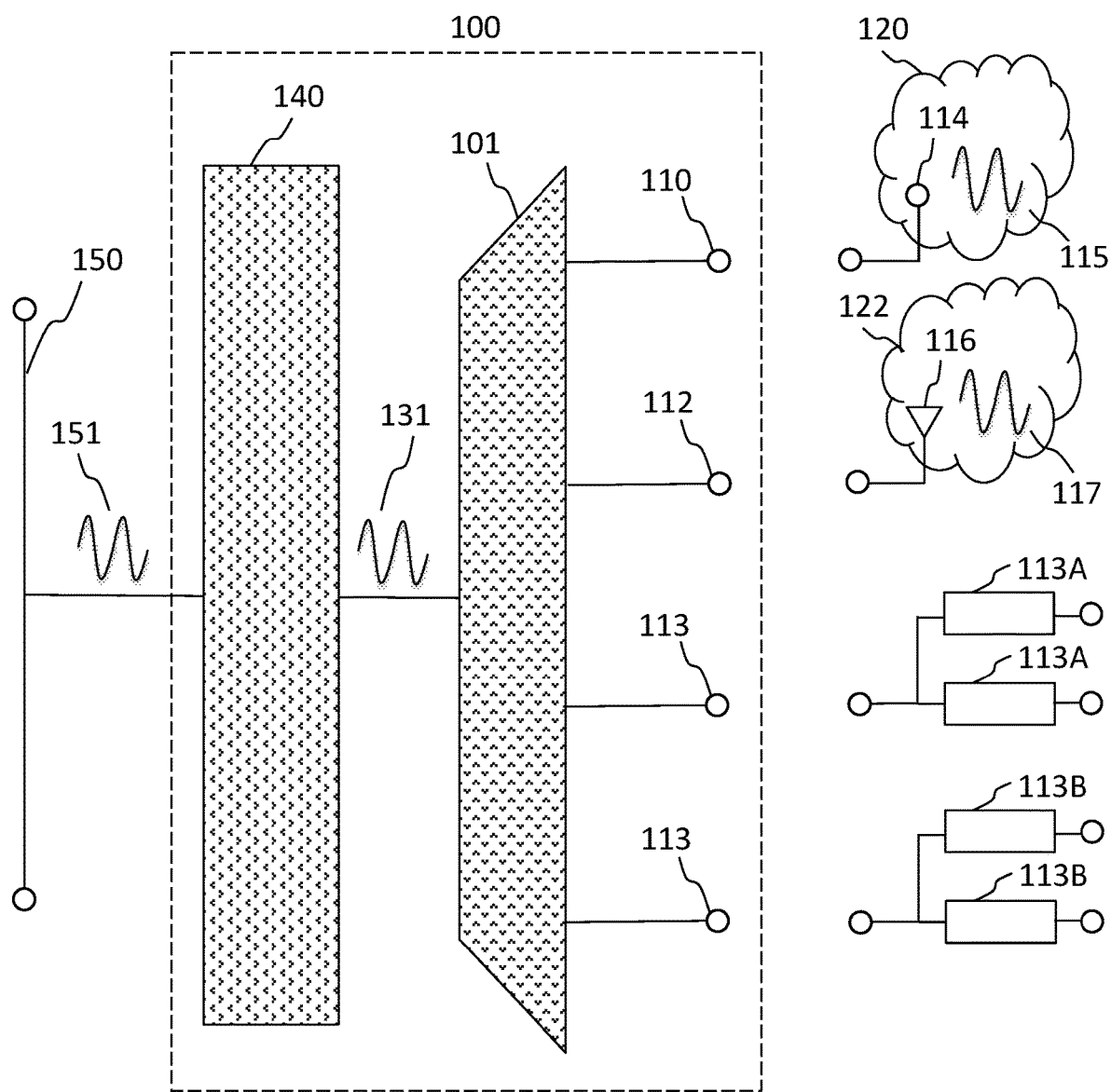
FIG. 1 is a block diagram of a first embodiment of the invented communicator circuit.

FIG. 1 illustrates a first communicator circuit 100 according to one embodiment. As shown in FIG. 1, the first communicator circuit 100 includes a front-end circuit 101, a first signal front end 110, and a second signal front end 112. The first signal front end 110 is adapted for electrically coupling with a first piezoelectric transducer 114. The piezoelectric transducer 114 is a device that is capable of converting a piezosignal 115 to electric signals. According to several embodiments, the piezosignal 115 can be sonic waves, ultrasonic waves, pressure waves, or other types of mechanical vibrations.

Conversely, such piezoelectric transducer may also be capable of converting electric signals to the piezosignal 115. In one embodiment, the piezoelectric transducer 114 is or comprises an ultrasonic transducer, such as a ceramic transducer APC International, Ltd. with an address at 46 Heckman Gap Road, Mill Hall, Pa. 17751, USA, or other suitable piezoelectric transducer known in the art. The second signal front end 112 is adapted for electronic coupling with a second transducer 116 that is adapted for converting a second signal 117 to electric signals or vice versa. In one embodiment, the second transducer 116 is a second piezoelectric transducer. According to a yet further embodiment of the invention, the second transducer 116 is an electromagnetic transducer. The electromagnetic transducer 116 is a device capable of converting electric signals to electromagnetic signals. The electromagnetic signals may be either electric signals, or magnetic signals, or electromagnetic signals. Conversely, the electromagnetic transducer 116 may also be capable of converting electromagnetic signals to electric signals. In one embodiment, the electromagnetic transducer 116 is a radio frequency transmitter and/or receiver. In another embodiment, the electromagnetic transducer 116 is an optical transmitter and/or receiver. In yet another embodiment, the electromagnetic transducer 116 is an infrared transmitter and/or receiver. The front-end circuit 101 is electrically coupled with both the first signal front end 110 and the second signal front end 112. The front-end circuit 101 is adapted for electrically coupling with, and transmitting a switching circuit output signal 131 to a processing circuit 140. The processing circuit 140 is electrically coupled with and disposed between the frond-end circuit 101 and the output target circuit 150, and is adapted to receive the switching circuit output signal 131 and transmit an output signal 151 to the output target circuit 150. The switching circuit output signal 131 derives from the piezosignal 115 that is received from the first piezoelectric transducer 114 and/or a second signal 117 that is received from the second transducer 116. The output signal 151 is substantively derived from the switching circuit output signal 131. In one embodiment, the piezosignal 115 and the second signal 117 are the same signal. Besides the first signal front end 110 and the second signal front end 112, other embodiments may further include one or more signal front ends 113 that are electronically coupled with the front-end circuit 101 and adapted for electronically coupling with other transducers 113A & 113B, either electromagnetic transducers 113A or piezoelectric transducers 113B.

Referring now generally to the Figures and particularly to FIG. 1, as illustrated in FIG. 1, the first piezoelectric transducer 114 can receive and/or transmit the piezosignal 115 through a first piezoconducting medium 120, which is capable of transporting pressure waves, vibrations, or other types of mechanical energy. The piezoconducting medium 120 can be a solid material (for example, wood, metal, water pipes, drywall, electrical wires, or optical fibers), liquid material (for example, water), gaseous material (for example, air), or composite material (for example, human body). The second transducer 116 can receive and/or transmit the second signal 117 through a second communication medium 122. The second communication medium 122 can be a second piezoconduction medium or an electromagnetic medium that is capable of transporting electric or electromagnetic energy. In one embodiment, the first piezoconducting medium 120 and the second communication medium 122 are the same medium. Yet in another embodiment, the first piezoconducting medium 120 and the second communication medium 122 are different and segregated mediums, and therefore, the piezosignal 115 that is received and/or transmitted through the first piezoelectric transducer 114 do not interfere with the second signal 117 that is received and/or transmitted through the second transducer 116.

Figure 2:
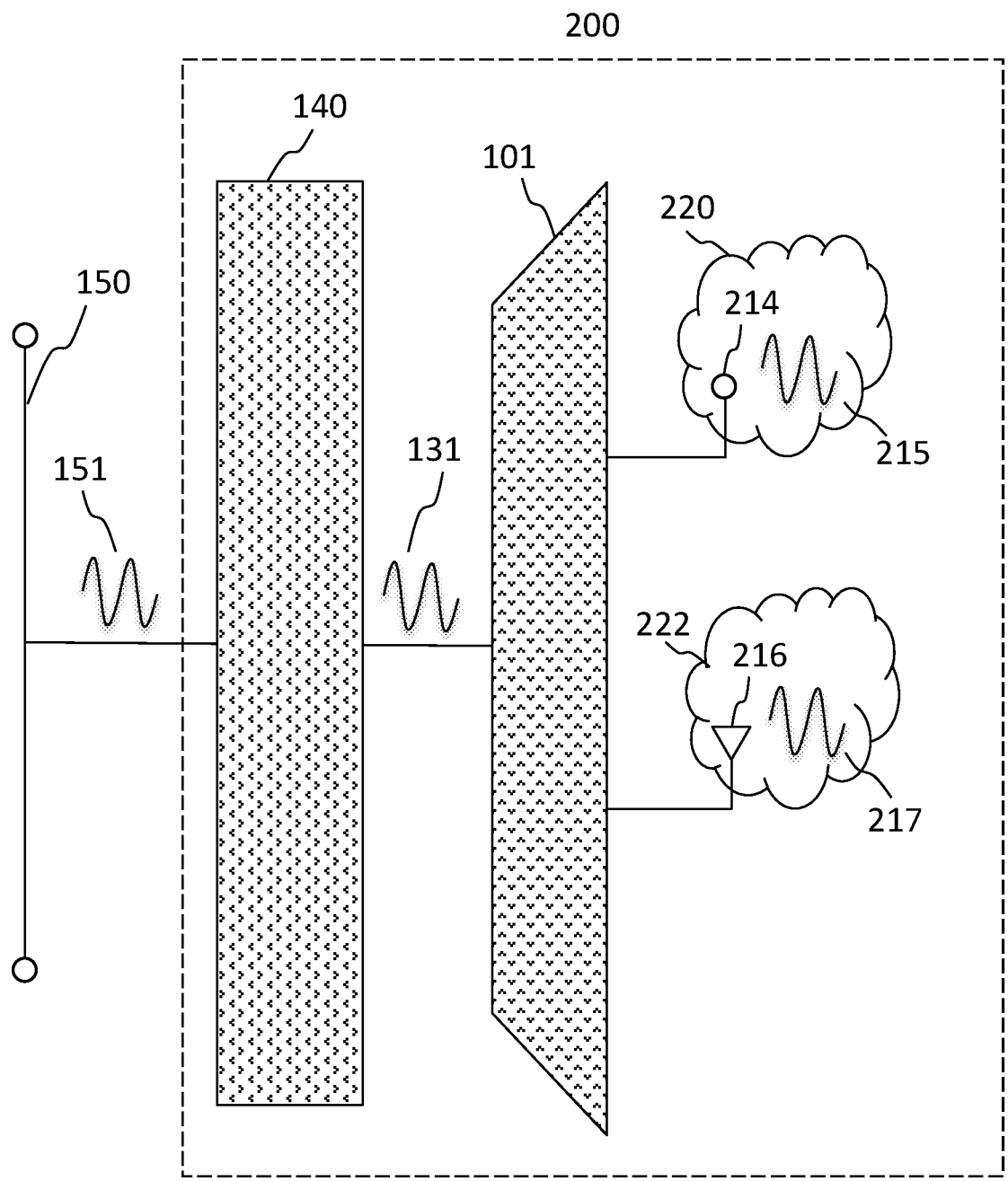
FIG. 2 is a block diagram of a second embodiment of the invented communicator circuit.

Referring now generally to the Figures and particularly to FIG. 2, FIG. 2 illustrates a second communicator circuit 200 according to another embodiment of the invention. In contrast to the first communicator circuit 100 as shown in FIG. 1, the second communicator circuit 200 includes a first piezoelectric transducer 214 and a second transducer 216 both of which may be electrically coupled with the front-end circuit 101. The first piezoelectric transducer 214 is capable of receiving and/or transmitting a piezosignal 215 through a first piezoconducting medium 220. The second transducer 216 can be a second piezoelectric transducer or an electromagnetic transducer. The second transducer 216 is capable of receiving and/or transmitting a second signal 217 (being a piezosignal or an electromagnetic signal) through a second communication medium 222. In one embodiment, the piezosignal 215 and the second signal 217 are components of a same signal energy. The first piezoconducting medium 220 and the second communication medium 222 may be the same medium or different and segregated mediums according to various embodiments. The front-end circuit 101 is adapted for electrically coupling with, and transmitting a switching circuit output signal 131 to a processing circuit 140. The processing circuit 140 is electrically coupled with and disposed between the front-end circuit 101 and the output target circuit 150, and is adapted to receive the switching circuit output signal 131 and transmit an output signal 151 to the output target circuit 150.

Figure 3A:
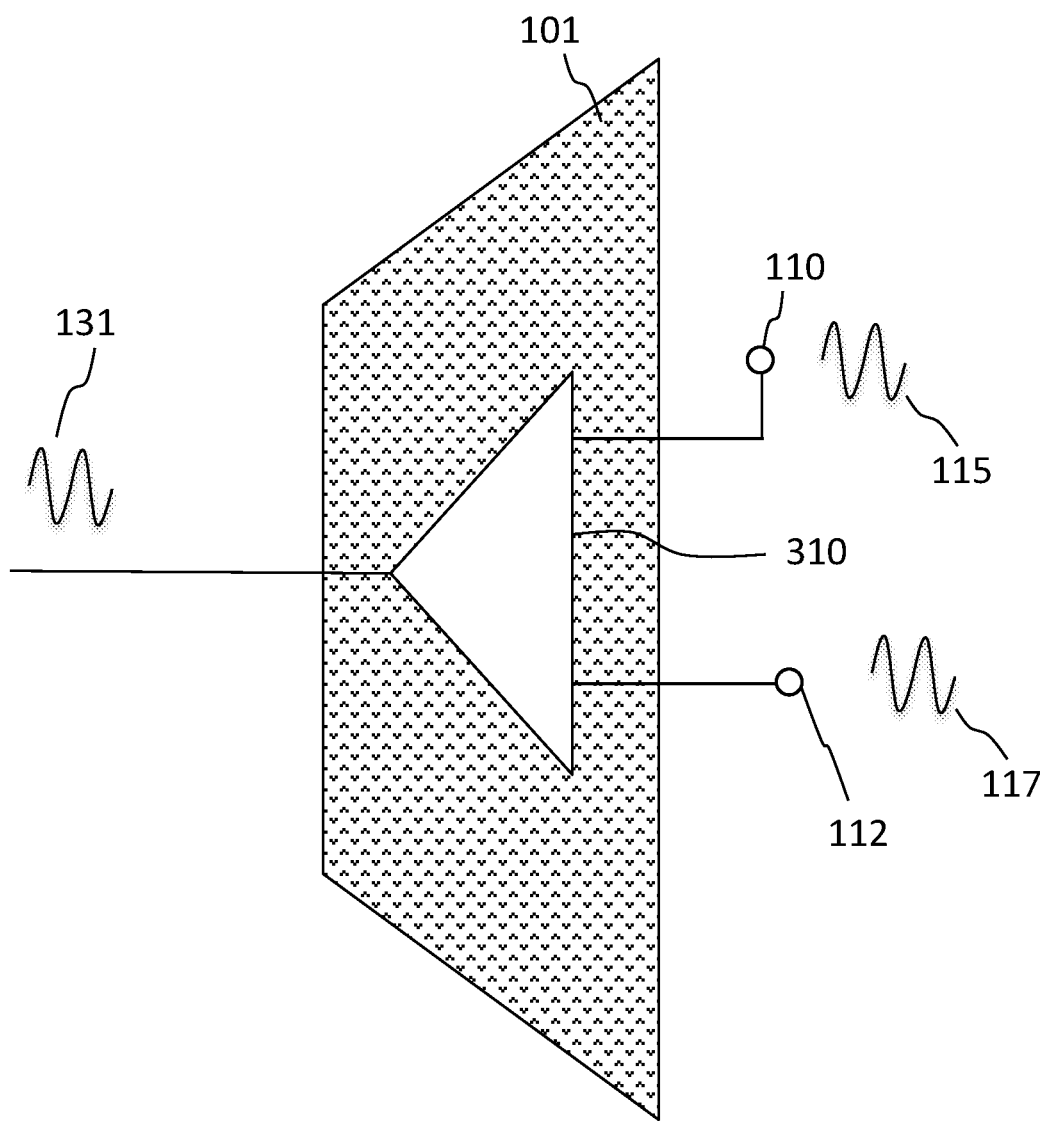
FIG. 3A is a block diagram of a first version of the front-end circuit of FIG. 1 or FIG. 2.
Figure 3B:
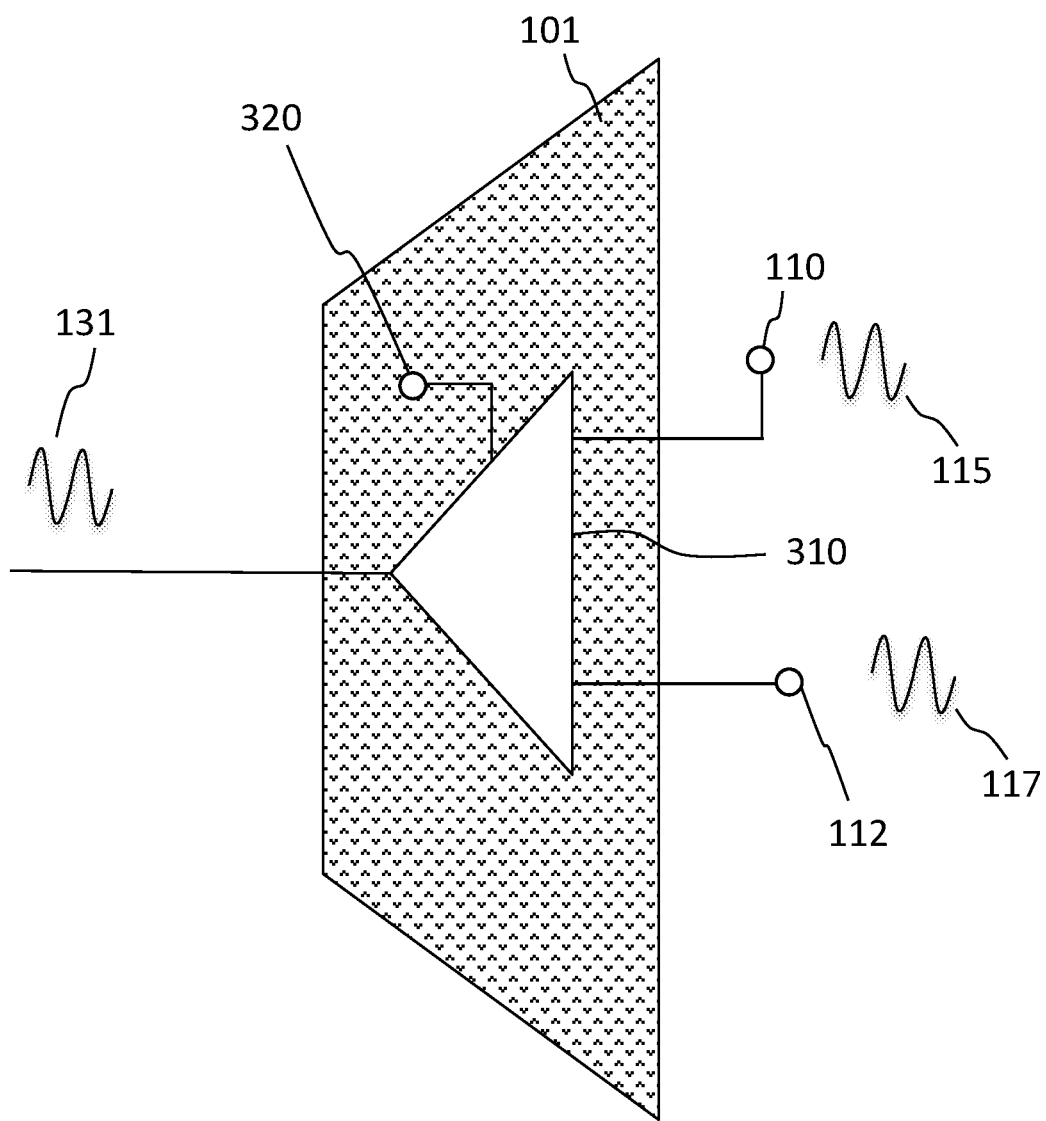
FIG. 3B is a block diagram of a second version of the front-end circuit of FIG. 1 or FIG. 2.

Referring now generally to the Figures and particularly to FIG. 3A and FIG. 3B, FIG. 3A and FIG. 3B further illustrate the internal modules 310 and 320, as well as the operating mechanism of the front-end circuit 101 that is shown in FIG. 1 and FIG. 2 according to several embodiments.

In one embodiment shown in FIG. 3A and FIG. 1, the front-end circuit 101 includes a switching circuit 310 that is electrically coupled to both the first signal end 110 and the second signal end 112. The switching circuit 310 is adapted to selectively enable a transmission of the piezosignal 115 that is substantively received from the first piezoelectric transducer 114 or the second signal 117 that is substantively received from the second transducer 116 as the switching circuit output signal 131 to the processing circuit 140. According to several embodiments, such selection is based on certain conditions. In one embodiment, the switching circuit 310 will transmit the second signal 117 as the switching circuit output signal 131 to the processing circuit 140, if the first piezosignal 115 is unavailable. According to another embodiment, the switching circuit 310 shown in FIG. 3A can transmit a multiplex signal that is derived from the piezosignal 115 and the second signal 117 as the switching circuit output signal 131 to the processing circuit 140. Yet according to another embodiment, the switching circuit 310 shown in FIG. 3A can transmit a summed signal that is composed of the piezosignal 115 and the second signal 117 as the switching circuit output signal 131 to the processing circuit 140.

According to one embodiment, shown in FIG. 3B and FIG. 1, the front-end circuit 101 includes a switching circuit 310 that is electrically coupled to both the first signal end 110 and the second signal end 112, and a processor 320 that is electrically coupled to the switching circuit 310. According to several embodiments, the processor 320 is adapted to direct the switching circuit 310 to transmit one of the following signal as the switching circuit output signal 131 to the output target circuit 140: the piezosignal 115, the second signal 117, the multiplex signal that is derived from the piezosignal 115 and the second signal 117, the summed signal that is composed of the piezosignal 115 and the second signal 117. Yet in another embodiment, the processor 320 is adapted to direct the switching circuit 310 to transmit no signal to the output target circuit 140.

Figure 4A:
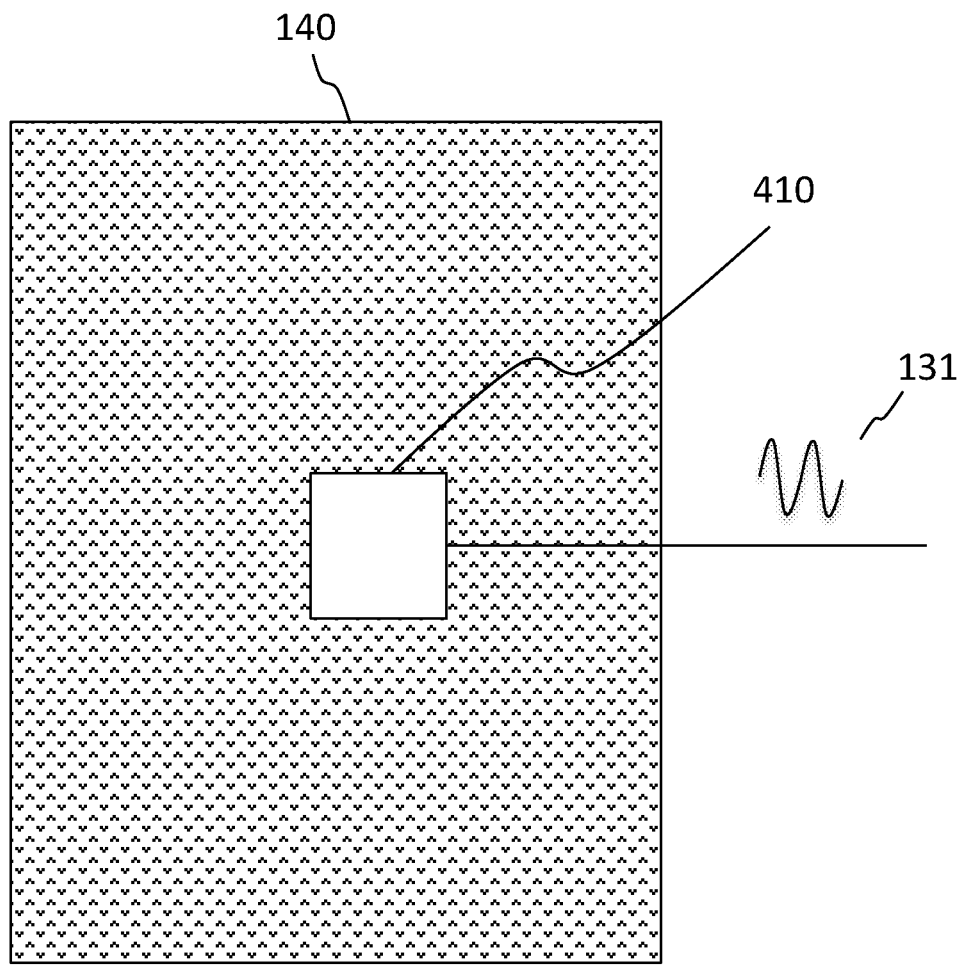
FIG. 4A is a block diagram of a first version of the processing circuit of FIG. 1 or FIG. 2.
Figure 4B:
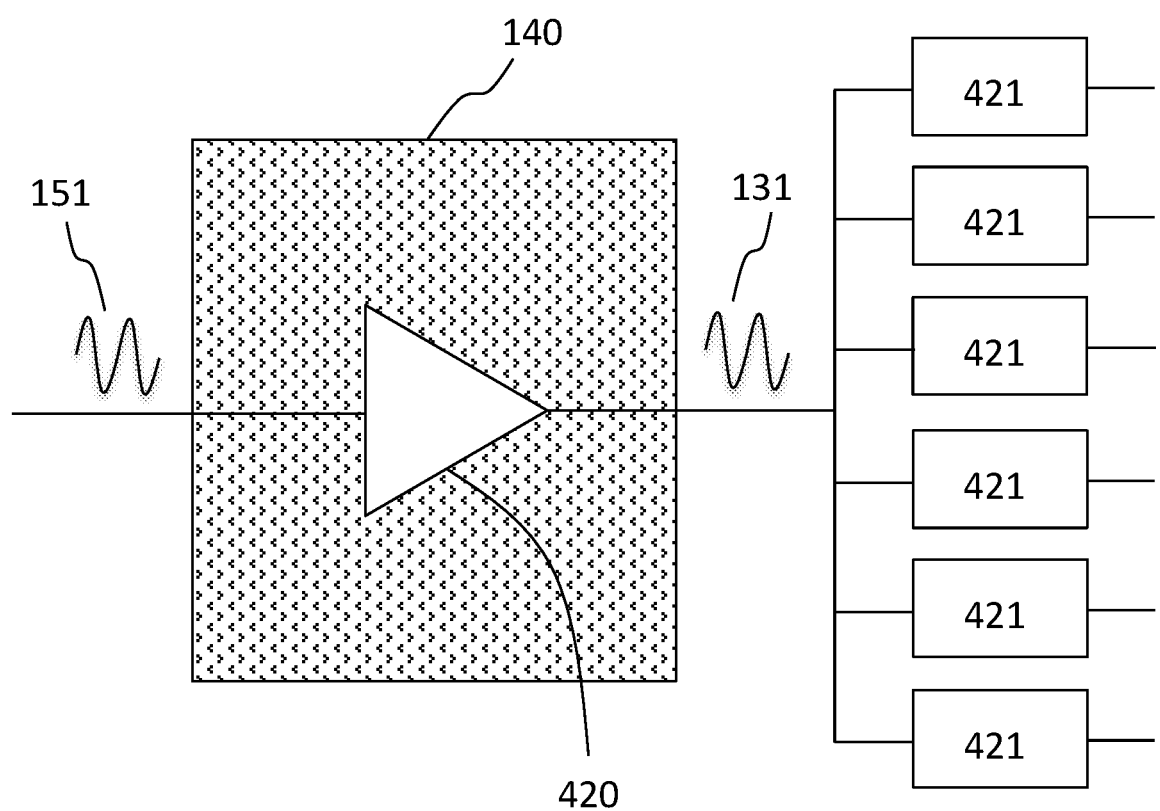
FIG. 4B is a block diagram of a second version of the processing circuit of FIG. 1 or FIG. 2.
Figure 4C:
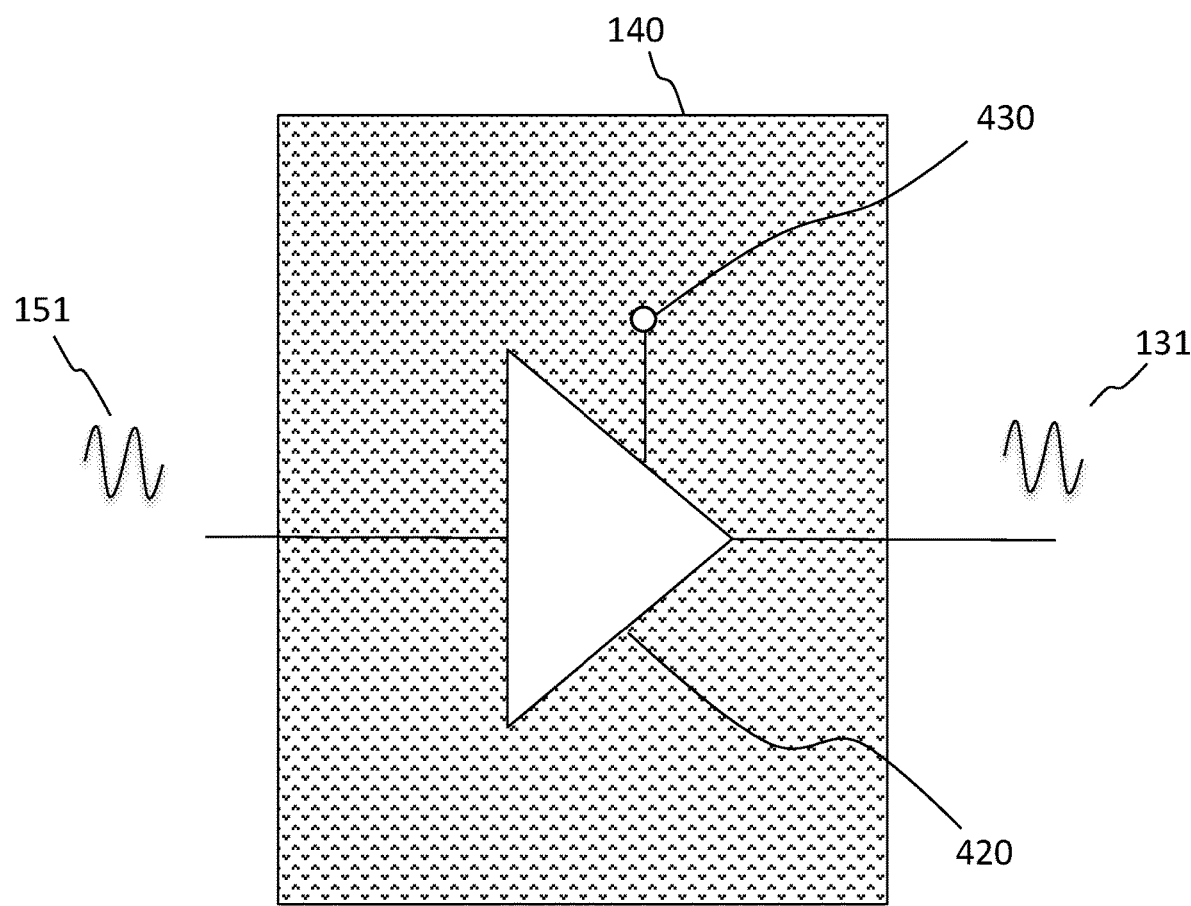
FIG. 4C is a block diagram of a third version of the processing circuit of FIG. 1 or FIG. 2.

FIG. 4A through FIG. 4C further illustrate the internal modules 410, 420 and 430, respectively, as well as the operating mechanism of the processing circuit 140 that is shown in FIG. 1 and FIG. 2 according to several embodiments.

In one embodiment, as illustrated in FIG. 2, FIG. 4 and FIG. 1, the processing circuit 140 includes a memory storage module 410 that is electrically coupled to the switching circuit 310 and adapted to receive from the switching circuit 310 and record the switching circuit output signal 131.

In another embodiment shown in FIG. 2, FIG. 4 and FIG. 1, the processing circuit 140 includes a communications module 420 that is electrically coupled to the switching circuit 310 and adapted to receive and transmit the switching circuit output circuit 131 to the output target circuit 150. In one embodiment, the communications module 420 shown in FIG. 4B is further adapted to generate a pressure-wave output signal that is substantively derived from the switching circuit output signal 131. In another embodiment, the communications module 420 shown in FIG. 4B is further adapted to generate an electromagnetic output signal that is substantively derived from the switching circuit output signal 131. In yet another embodiment the communications module 420 shown in FIG. 4B is adapted to generate a pressure-wave output signal and/or an electromagnetic output signal. According to several embodiments, the pressure-wave output signal can be redirected directly, through the switching circuit 310, or through other circuits, to the first piezoelectric transducer 114, while the electromagnetic output signal can be redirected directly, through the switching circuit 310, or through other circuits, to the second transducer. As a result, the pressure-wave output signal can be converted to pressure waves that are transmitted through the first piezoconducting medium 120, while the electromagnetic output signal can be converted to electromagnetic energy that is transmitted through the second communication medium 122. According to several other embodiments, the pressure-wave output signal and the electromagnetic output signal that are generated by the communications module 420 can be redirected to other transducers 421.

According to another embodiment that is illustrated in FIG. 4C, the processing circuit 140 can further include a transmission logic module 430. The transmission logic module 430 is electrically coupled with the communications module 420. According to several embodiments, the transmission logic module 430 is adapted to direct the communications module 420 to transmit one of the following signals as the output signal 151 to the output target circuit 150, as shown in FIG. 1 the pressure-wave output signal generated by the communications module 420, the electromagnetic output signal generated by the communications module 420, a multiplex signal derived from the pressure-wave output signal and the electromagnetic output signal, and a summed signal substantively composed of a combination of the pressure-wave output signal and the electromagnetic output signal. In one embodiment, the transmission logic module 430 shown in FIG. 4C is electrically coupled with the processor 320 shown in FIG. 3B. In another embodiment, a single processor can function as both the transmission logic module 430 shown in FIG. 4C and the processor 320 shown in FIG. 3B.

Figure 5A:
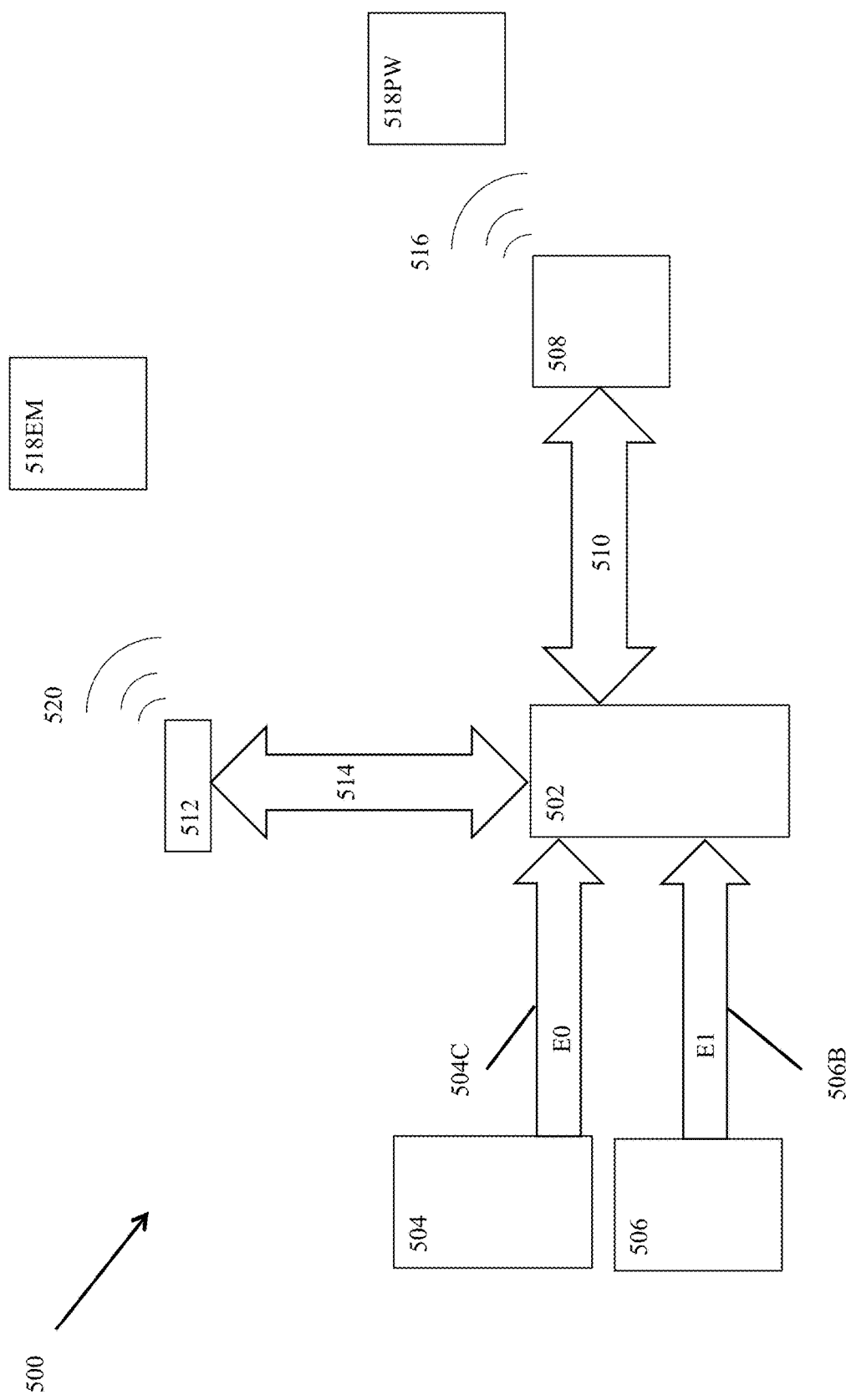
FIG. 5A is a block diagram of a third preferred embodiment of the present invention that includes a summing controller that is coupled to both an electrical power source and a digitized data source.

Referring now generally to the Figures and particularly to FIG. 5A, FIG. 5A is a block diagram of a third preferred embodiment of the present invention (hereinafter, "the third system" 500) that includes a summing controller 502 that is coupled to both an electrical power source 504 and a digitized data source 506. The summing controller 502 is further coupled to both a first alternate piezoelectric transducer 508 by means of a bidirectionally electrically conductive first channel 510 that delivers electromagnetic energy to and from the summing controller 502, and a first electromagnetic transducer 512 by means of a bidirectionally electrically conductive second channel 514 that delivers electromagnetic energy to and from the summing controller 502.

The controller 502 is adapted to receive an electrical energy E0 from the electrical power source 504 via a power signal channel 504C and an information-bearing electrical signal E1 from the digitized data source 506 via a data signal bus 506B and to derive from these energy signals E0 & E1 at least a first piezoelectric control signal PZ1 and/or a first electromagnetic control signal EM1. The first piezoelectric control signal PZ1 is an electrical energy signal generated by the summing controller 502 and includes a derivation of the information-bearing electrical signal E1; the first piezoelectric control signal PZ1 is delivered to the first alternate piezoelectric transducer 508 via of the first channel 510. The first electromagnetic signal EM1 is generated by the summing controller 502 and includes a derivation of the information-bearing electrical signal E1; the first electromagnetic signal EM1 is delivered to the first electromagnetic transducer 512 via of the second channel 514.

The summing controller 502 may be or comprise a suitable programmable or reprogrammable electronic device, programmable or reprogrammable electronic controller, microcontroller, processor and/or microprocessor known in the art, such as but not limited to an MSP™ microcontroller as marketed by Texas Instruments, Inc. of Dallas, Tex.

As enabled by the summing controller 502, the first alternate piezoelectric transducer 508 derives a first output pressure wave 516 from the first piezoelectric control signal PZ1 and transmits the first output pressure wave 516 for reception by a pressure wave reception target device 518PW. As alternately or additionally enabled by the summing controller 502, the first electromagnetic transducer 512 derives a first electromagnetic wave energy emission 520 from the first electromagnetic signal EM1 and transmits the first electromagnetic wave energy emission 520 for reception by an electromagnetic energy reception target device 518EM.

Figure 5B:
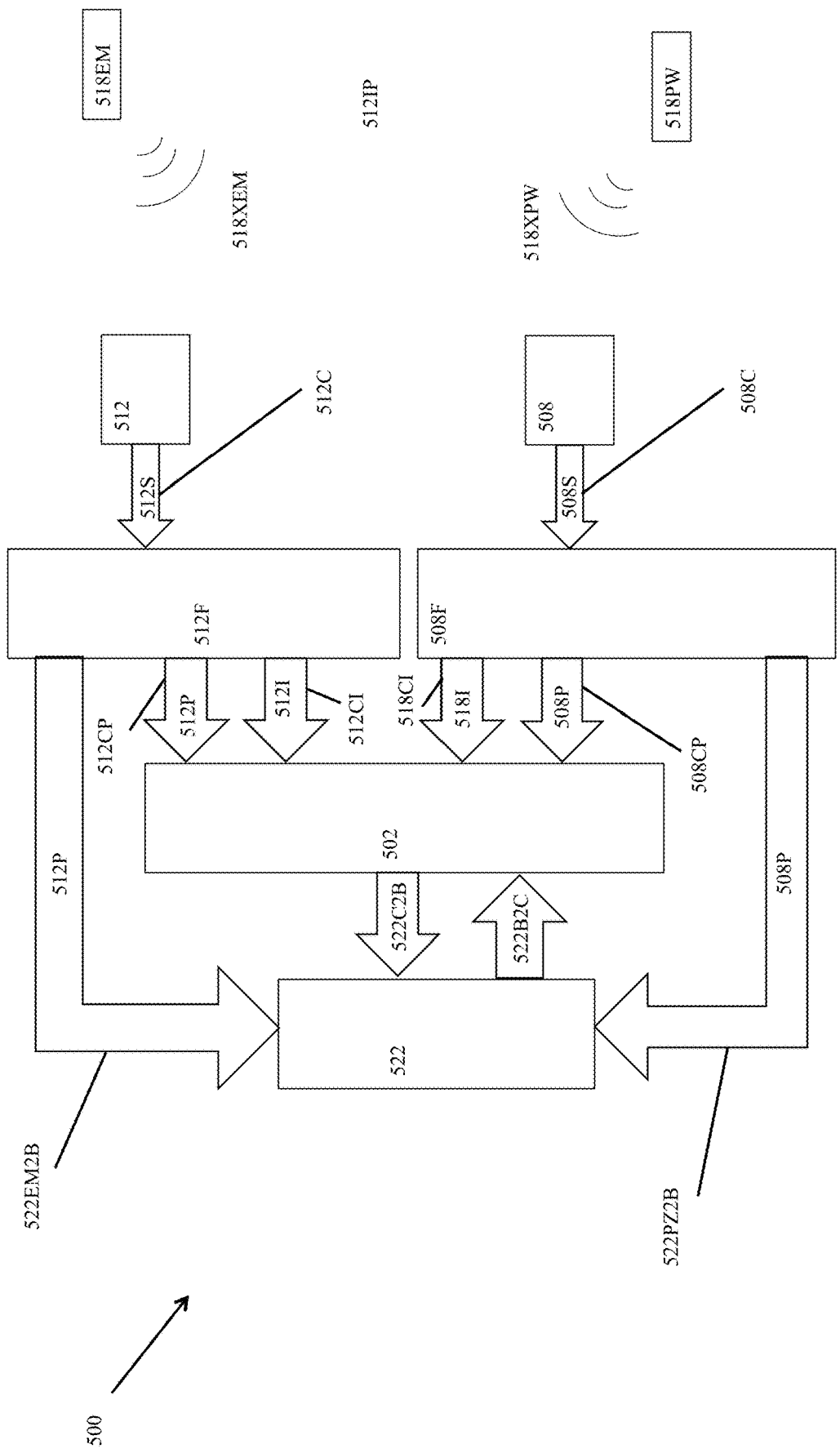
FIG. 5B is a block diagram of the alternate third preferred embodiment of the present invention of FIG. 5A that optionally includes a battery coupled with the one or more of the controller and the transducers of FIG. 5A.

Referring now generally to the Figures and particularly to FIG. 5B, FIG. 5B presents the third system 500 as further including an optional battery 522 that is coupled with one or more of the controller 502, the first alternate piezoelectric transducer 508, and/or the first alternate electromagnetic transducer. The battery 522 may be coupled with a power-to-controller channel 522B2C that enables the controller 502 to receive the power signal E0 from the battery 522. The third system may alternatively or optionally include a controller-to-battery channel 522C2B that enables the controller 502 to deliver electrical energy sourced from either transducer 508 & 512 to the battery 522.

The third system 500 may further optionally or alternatively include a first piezoelectric transducer filter 508F that is disposed between the first alternate piezoelectric transducer 508 and the controller 502. The first alternate piezoelectric transducer 508 receives target pressure wave energy 518XPW from a pressure wave generating target device 518PW and generates therefrom an internal electromagnetic PZ signal 508S. A PZ filter channel 508C receives the internal electromagnetic PZ signal 508S from the first alternate piezoelectric transducer 508 and delivers the internal electromagnetic PZ signal 508S to the first PZ transducer filter 508F. The first PZ transducer filter 508F filters out a PZ information signal 508I and a PZ electrical power component 508P from the internal electromagnetic PZ signal 508S and delivers at least the PZ information signal 508I to the controller via a PZ information channel 518CI, and optionally and additionally delivers the PZ electrical power component 508P via a PZ power channel 508CP to the controller 502. The controller 502 may be adapted and configured to deliver at least a portion of the received PZ electrical power component 508P to the battery 522 via the controller-to-battery channel 522C2B.

Optionally, alternatively or additionally, the third system 500 may include a PZ-to-battery channel 522PZ2B that delivers the PZ electrical power component 508P from the first PZ transducer filter 508F to the battery 522.

The third system 500 may further optionally or alternatively include a first electromagnetic transducer filter 512F that is disposed between the first alternate electromagnetic transducer 512 and the controller 502. The first alternate electromagnetic transducer 512 receives target electromagnetic energy 518XEM from an electromagnetic energy generating target device 518EM and generates therefrom an internal electromagnetic EM signal 512S. An EM filter channel 512C receives the internal electromagnetic signal 512S from the first alternate electromagnetic transducer 512 and delivers the internal electromagnetic signal 512S to the first electromagnetic transducer filter 512F. The first electromagnetic transducer filter 512F filters out an electromagnetic information signal 512I and an electrical power component 512P from the internal electromagnetic signal 512S and delivers at least the electromagnetic information signal 512I to the controller 502 via as EM information channel 512CI, and optionally and additionally delivers the electrical power component 512P via an EM power channel 512CP to the controller 502. The controller 502 may be adapted and configured to deliver at least a portion of the received EM electrical power component 512P to the battery 522 via the controller-to-battery channel 522C2B.

Optionally, alternatively or additionally, the third system 500 may include a electromagnetic filter-to-battery channel 522EM2B that delivers the EM electrical power component 512P from the first electromagnetic transducer filter 512F to the battery 522.

Figure 5C:
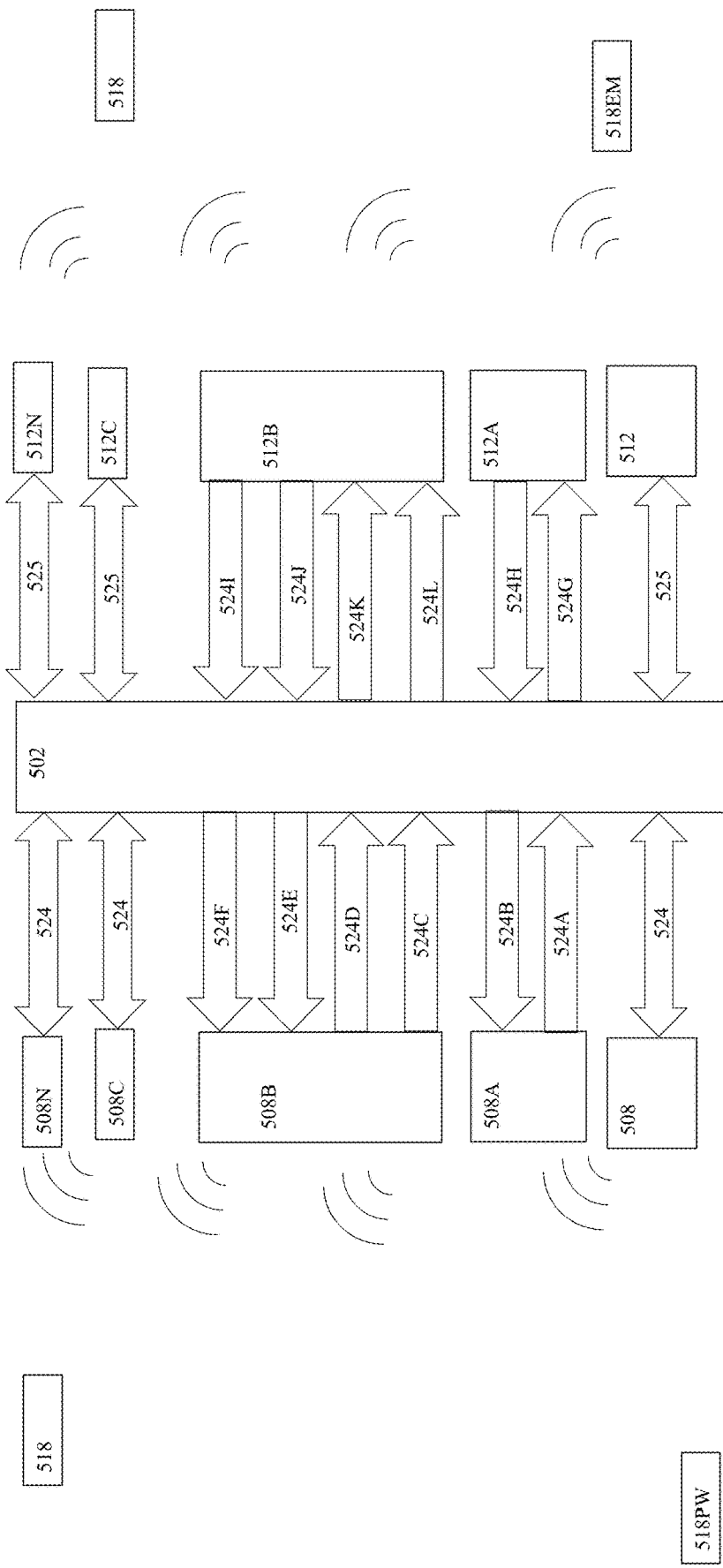
FIG. 5C is a block diagram of an alternate third preferred embodiment of the present invention of FIG. 5A that includes a plurality of target devices, electromagnetic transducers and piezoelectric transducers.

Referring now generally to the Figures and particularly to FIG. 5C, FIG. 5C is a block diagram of additional optional aspects and elements of the third system 500, wherein a plurality of electromagnetic transducers 512 & 512A-512N are a plurality of piezoelectric transducers 508 & 508A-508N are bi-directionally communicatively coupled with the controller 502 in one of a variety of communications pathway configurations. It is understood that one or more electromagnetic transducers 512-512N be or comprise a suitable electromagnetic energy receiving transducers, such as but not limited to, a CC1101™ a Low-Power Sub-1 GHz RF transceiver, as marketed by Texas Instruments of Dallas, Tex., or other suitable electromagnetic energy wave transducer or emitter known in the art. It is further understood that one or more piezoelectric transducers 508-508N may be or comprise a suitable pressure wave energy receiving transducers, such as but not limited to, a 90-4070™ ceramic ultrasonic transducer as marketed by APC International, Ltd. of Mill Hall, Pa., or other suitable piezoelectric or pressure wave transducer or emitter known in the art.

The first alternate piezoelectric transducer 508 transmits and receives information bearing signals and electrical power to the controller 502 via a bi-directional power and communications bus 524. A second alternate piezoelectric transducer 508A (a.) transmits information bearing signals and electrical power to the controller 502 via a first uni-directional power and communications bus 524A, and (b.) receives information bearing signals and electrical power from the controller 502 via a second uni-directional power and communications bus 524B. A third alternate piezoelectric transducer 508B (a.) transmits information bearing signals to the controller 502 via a first uni-directional communications channel 524C, (b.) transmits electrical power to the controller 502 via a first uni-directional power channel 524D, (c.) receives information bearing signals from the controller 502 via a second uni-directional communications channel 524E, and (d.) receives electrical power from the controller 502 via a second uni-directional power channel 524F.

The first alternate electromagnetic transducer 512 transmits and receives information bearing signals and electrical power to the controller 502 via an additional bi-directional power and communications bus 525. A second alternate electromagnetic transducer 512G (a.) transmits information bearing signals and electrical power to the controller 502 via a first uni-directional EM power and communications bus 524A, and (b.) receives information bearing signals and electrical power from the controller 502 via a second uni-directional EM power and communications bus 524H. A third alternate electromagnetic transducer 512B (a.) transmits information bearing signals to the controller 502 via a first uni-directional EM communications channel 524I, (b.) transmits electrical power to the controller 502 via a first uni-directional EM power channel 524J, (c.) receives information bearing signals from the controller 502 via a second uni-directional EM communications channel 524K, and (d.) receives electrical power from the controller 502 via a second uni-directional EM power channel 524L.

Figure 6:
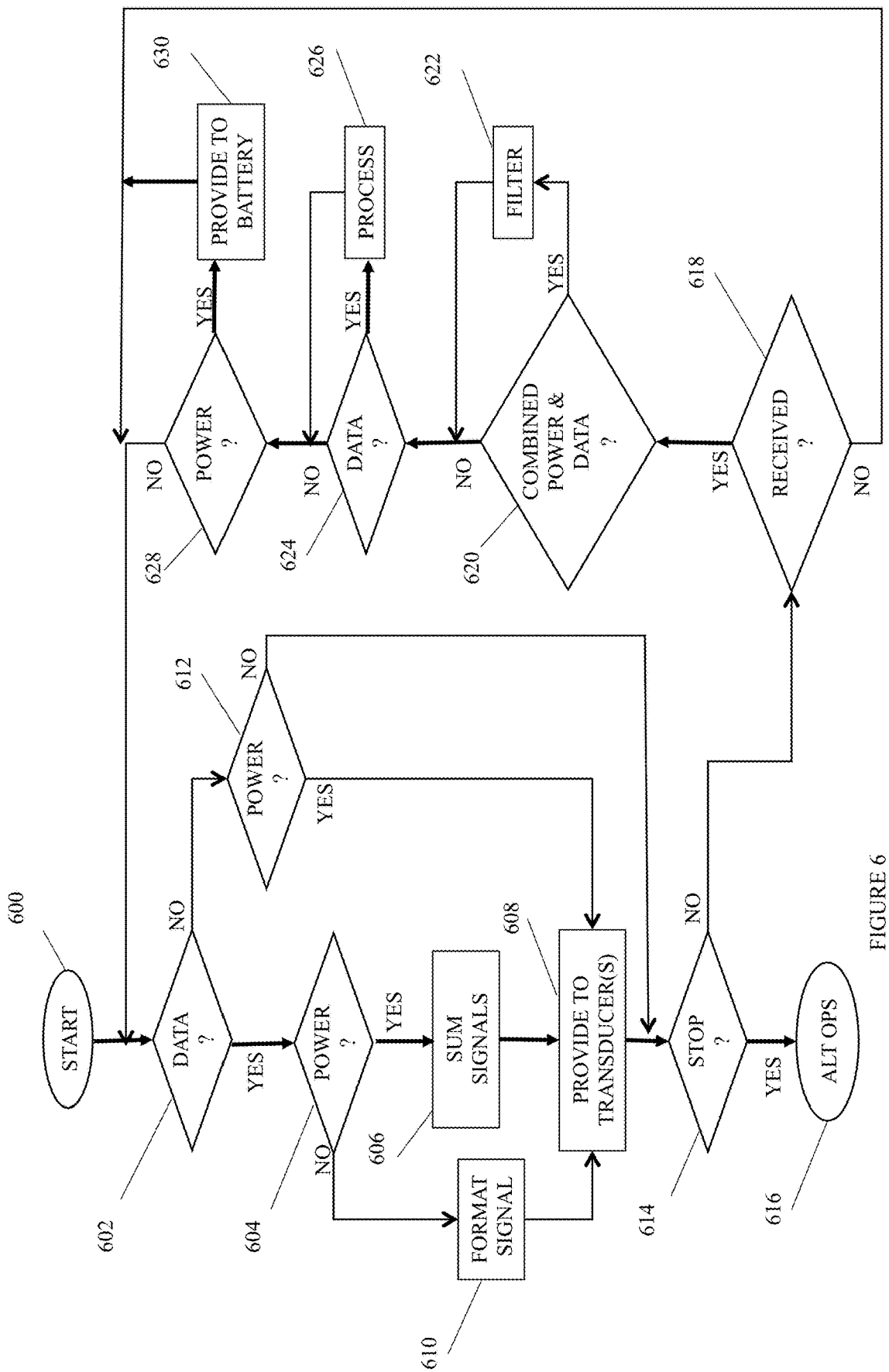
FIG. 6 is a flowchart of optional aspects of the operation of the controller of FIG. 5A.

FIG. 6 is a flowchart of optional aspects of the operation of the controller 502. In step 600 the summing controller 502 powers up and determines in step 602 if any data has been received from the data source 504. When the summing controller 502 determines in step 602 that data E0 has been received from the digitized data source 504 and further in step 606 that electrical energy E1 is to be accessed from the electrical power source 506, the summing controller 502 proceeds on to step 606 and sums the received data E0 of step 602 with electrical energy E1 received from the electrical energy source 506 and provides the summed signal to one or more transducers 508-508N & 512-512N in step 608.

In the alternative, the summing controller 502 proceeds from step 604 to step 610 when no electrical power E1 is to be transmitted. In step 610 the received digitized data E0 is formatted into a formatted signal which is then provided to one or more transducers 508-508N & 512-512N in step 608. In another alternative, the summing controller 502 proceeds from step 602 to step 612 when no received data E0 is detected in step 602. When the summing controller 502 determines in step 612 that no electrical power E1 is authorized to be transmitted, the summing controller 502 proceeds from step 612 to step 614 and to determine if alternate operations shall be performed in step 616.

When the summing controller 502 proceeds from step 614 to step 618, the summing controller 502 determines whether one or more transducers 508-508N & 512-512N has respectively received either external electromagnetic energy or external pressure wave energy. If the summing controller 502 determines in step 618 that no transducer 508-508N & 512-512N has received external energy, the summing controller 502 proceeds back to an additional execution of step 602. In the alternative, when the summing controller 502 determines in step 618 that at least one transducer 508-508N & 512-512N has received external energy, the summing controller 502 proceeds on to step 620 and to determine if an information bearing signal shall be separated from the received energy and filters out the information bearing message from any additional power signal in step 622. The summing controller 502 determines in step 624 if any information has been found in the received energy in step 624 and proceeds to process, e.g., store or retransmit, any detected received information in step 626. The summing controller 502 determines in step 628 if any storable power has been found in the received energy and proceeds to transfer any such received storable power in step 630. The summing controller 502 proceeds from step 618, step 630 or step 628 to an additional execution of step 602.

Figure 7:
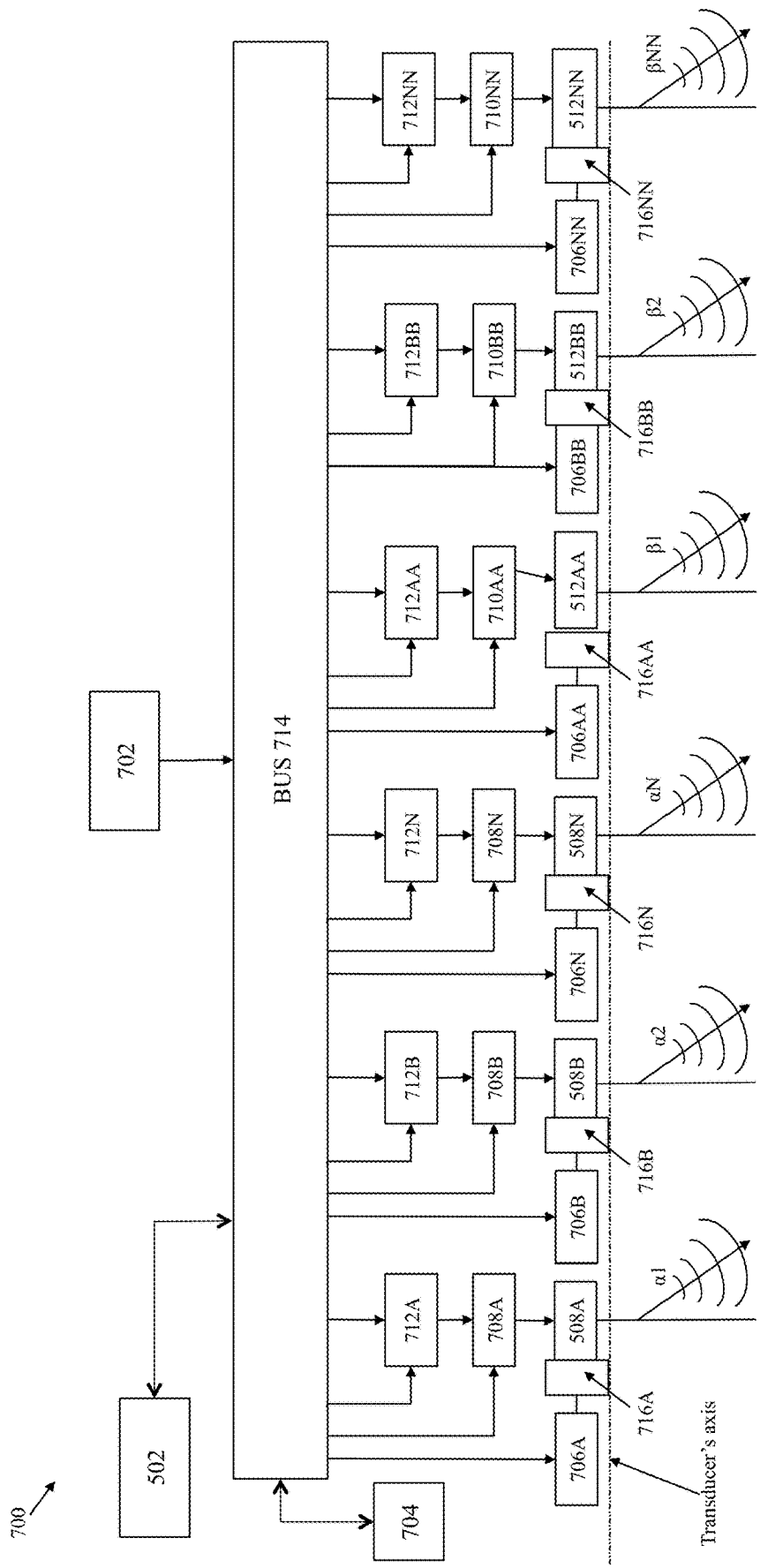
FIG. 7 is a block diagram of an alternate fourth embodiment of the present invention that further comprises the transducers and summing controller of FIG. 5C and means to phase shift energy emitted from the transducers.

Referring now generally to the Figures and particularly to FIG. 7, FIG. 7 is a block diagram of an alternate fourth embodiment of the present invention 700 (hereinafter, "the fourth system" 700) that further comprises an EM signal source 702, a servomotor controller 704, a plurality of servomotors 706A-706NN, a plurality of PW programmable phase-shift delay circuits 708A-708N, a plurality of EM phase-shift delay circuits 710AA-710NN, a plurality of controllable signal switches 712A-712NN, and a communications and power bus 714. It is understood that in certain alternate preferred embodiments of the fourth method, some or all of the aspects and functionalities of the servomotor controller 704 are comprised within and/or provided by the summing controller 502.

The signal source is communicatively coupled via the communications and power bus 714 to each EM programmable phase-shift delay circuits 708A-708N and each PW phase-shift delay circuits 710AA-710NN. Individual dedicated controllable signal switches 712A-712NN are each separately disposed on a one-to-one basis between the via the communications and power bus 714 and a single EM transducer 512AA-512NN or a single PW transducer 508A-508N.

The communications and power bus 714 additionally communicatively couples the summing controller 502 to each controllable signal switch 712A-712NN, each of the plurality of EM programmable phase-shift delay circuits 708A-708N and each of the plurality of PW phase-shift delay circuits 710AA-710NN. The communications and power bus 714 also communicatively couples the servomotor controller 704 to each of the plurality of servomotors 706A-706NN.

Each servomotor 706A-706NN comprises a platen 716A-716NN to which one of plurality of piezoelectric transducers 508AA-508NN or one of the plurality of electromagnetic transducers 512A-512N is exclusively mechanically coupled in a one-to-one basis.

FIG. 7 represents that each EM transducer 512AA-512NN is emitting energy that has been uniquely phase shifted as a result of phase shifting by one dedicated programmable EM phase-shift delay circuit 708A-708N; and further that each piezoelectric transducer 508AA-508NN is emitting energy that has been uniquely phase shifted by one dedicated programmable PW phase-shift delay circuits 710A-710NN.

Figure 8:
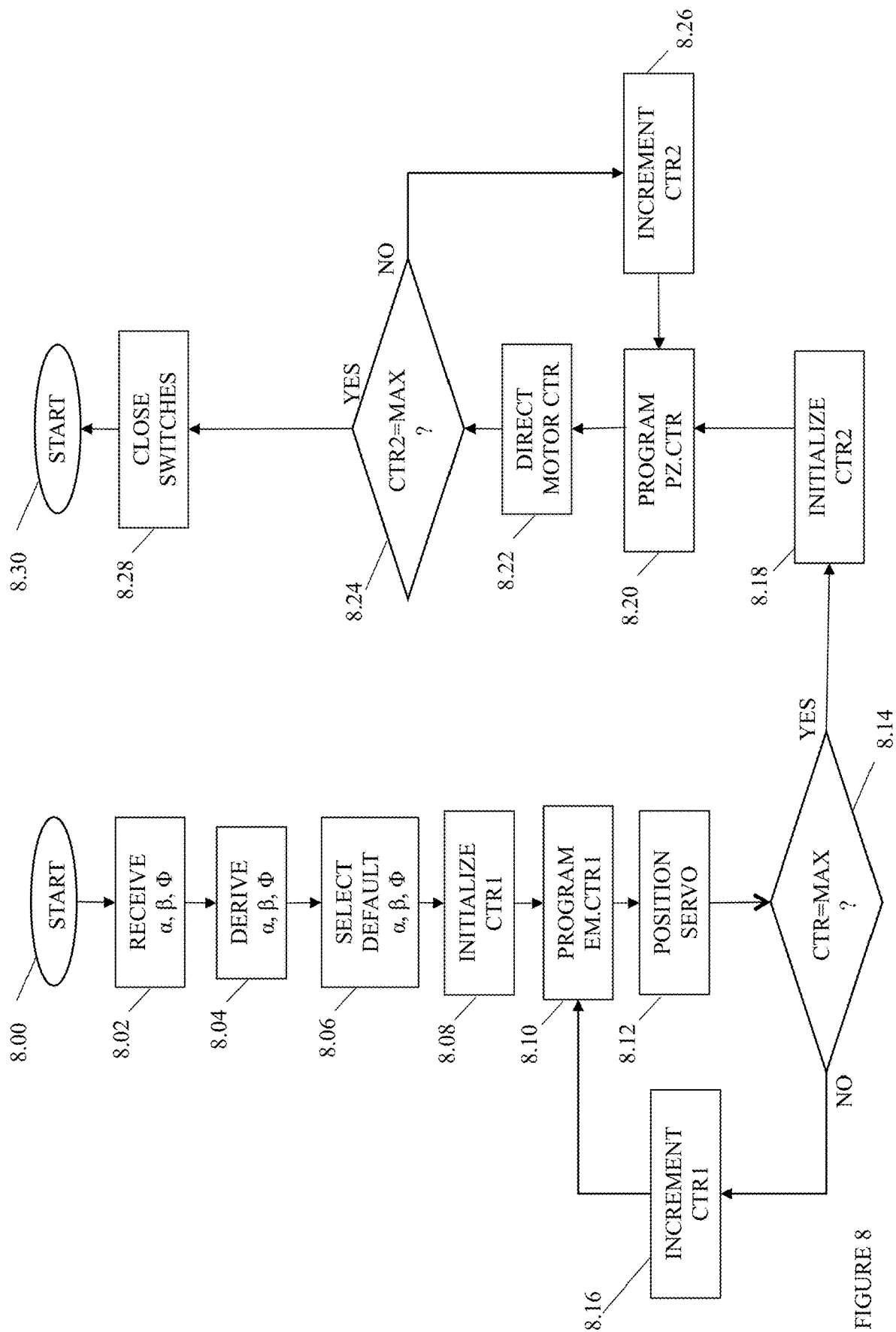
FIG. 8 is a flowchart of a fourth alternate preferred embodiment of the present invention of FIG. 4 wherein the transducers and summing controller of FIG. 5C emit phase-shifted energy.

Referring now generally to the Figures and particularly to FIG. 8, FIG. 8 is a flowchart of a fourth alternate preferred embodiment of the method of the present invention (hereinafter, "the fourth method"), wherein the plurality of electromagnetic transducers 512AA-512NN and the plurality piezoelectric transducers 508A-508N emit individually phase-shifted energy waves and whereby the energy emitted from the fourth system 700 is directed toward an external target device (not shown). The flowchart of FIG. 8 illustrates the summing controller 502 directing the transducers 508A-508N & 512AA-512NN providing emissions of phase-shifted energy.

In step 8.00 the fourth system 700 powers up and in optional step 8.02 the summing controller 502 receives the one or more of the values $\alpha$, $\beta$, or $\Phi$ from an outside source (not shown). It is understood that the $\alpha$ value is a factor of mechanical orientation applicable to one or more of the piezoelectric transducers 508A-508N; that the $\beta$ value is an EM factor of mechanical orientation applicable to one or more of the EM transducers 512AA-512NN; and the $\Phi$ value is a phase shift factor applicable to the phase shifting of output signals of one or more of the transducers 508A & 508N and 512AA & 512NN.

Alternatively, optionally or additional to step 8.04, the fourth system 700 in step 8.06 derives the one or more of the values $\alpha$, $\beta$, or $\Phi$, and in further alternatively, optionally or additional to step 8.02, the fourth system 700 selects default values.

The summing controller initializes a first counter variable CTR to a null value in step 8.08 and proceeds through the loop of steps 8.10 through 8.14 wherein (a.) in step 8.10 the summing controller sequentially programs each EM transducer phase-shift delay circuit 710AA-710NN with preferably ascending or descending multiples of the phase shift value $\Phi$; and (b.) directs the positioning of each corresponding servomotor platen 716AA-716NN in step 8.12 in accordance with the $\beta$ values, i.e. the $\beta$1 value through the $\beta$NN value. In step 8.14 the summing controller determines whether the current value of the first counter variable CTR1 has become equal or greater than the total count NN of EM transducers 512AA-512NN. When the summing controller determines in step 8.14 that the current value of the first counter variable CTR1 has not become equal or greater than in value than the NN count, the summing controller proceeds on to step 8.16 and increments the value of the first counter variable CTR1. The summing controller proceeds on from step 8.16 to perform an additional execution of step 8.10. Alternatively, when the summing controller determines in step 8.14 that the current value of the first counter variable CTR1 has become equal or greater than in value than the NN count, the summing controller proceeds from step 8.14 to step 8.16 and initializes a second counter variable CTR2.

The summing controller 502 proceeds from step 8.18 and to execute the loop of steps 8.20 through 8.26, wherein (a.) in step 8.20 the summing controller sequentially programs each piezoelectric transducer phase-shift delay circuit 708A-708N with preferably ascending or descending multiples of the phase shift value $\Phi$; and (b.) directs the positioning of each corresponding servomotor platen 716A-716N in step 8.22 in accordance with the $\alpha$ values, i.e. the $\alpha$1 value through the $\alpha$N value. In step 8.24 the summing controller determines whether the current value of the second counter variable CT2 has become equal or greater than the total count N of piezoelectric transducers 508A-508N. When the summing controller determines in step 8.24 that the current value of the second counter variable CTR2 has not become equal or greater than in value than the N count, the summing controller proceeds on to step 8.26 and increments the value of the second counter variable CTR2. The summing controller proceeds on from step 8.26 to perform an additional execution of step 8.20. Alternatively, when the summing controller determines in step 8.24 that the current value of the second counter variable CTR12 has become equal to or greater than in value than the N count, the summing controller proceeds from step 8.24 to step 8.28 and directs the switches 712A-712NN to open and to allow an electromagnetic signal from the signal source 702 to reach the phase shift delay circuits 708A-708N, whereby the energy emitted from the fourth system 700 is directed toward an external target device (not shown).

The summing controller 502 proceeds from step 8.28 and to execute alternate computational operations.

Referring now generally to the Figures and particularly to FIG. 9A through 9E, FIG. 9A discloses a fifth invented system 900 and method of simultaneous use of vibrational energy transducer 902 & 904, for example a piezoelectric ultrasound transducer, and an electromagnetic energy transducer 906 & 908 respectively comprising an antenna 910 & 912, in order to form a novel geolocation system which is more advantageous to geolocation systems that use either an electromagnetic or an ultrasound emitter separately.

At a high level the fifth invented system 900 includes at least two base stations 914 & 915 that each comprise respectively at least one electromagnetic energy transducer 906 & 908 and at least one vibrational energy transducer 902 & 904. It is understood that either of the vibrational signal generating systems 902 & 904 maybe a piezoelectric device that generates a pressure wave, a sound wave, an ultrasonic wave, and/or other vibrational energy waveform. It is understood that the fifth invented system 900 may optionally further comprise one or more additional base stations 914A-914N that each preferably comprise some or all elements and aspects of the first base station 914 and the second base station 915. It is further understood that one or more of the plurality of base stations 914, 914A-914N & 915 may comprise some or all of the aspects and elements of third system 500.

The first base station 914 applies a first electromagnetic signal transducer 906 and a first vibrational energy transducer 902 to generate a pair of separate signals (optionally derived from a same first trigger signal) which will be effectively simultaneously transmitted from both the first electromagnetic signal generating system 906 and the first vibrational energy transducer 902 from the first base station 914, wherein said two distinguishable signals are alternatively transmitted at known or agreed times of transmission from the first base station 914.

The second base station 915 applies a second electromagnetic energy transducer 908 and a second vibrational energy transducer 904 to generate a second pair of separate signals (optionally derived from a same second trigger signal) which will be effectively simultaneously transmitted from both the second electromagnetic energy transducer 908 and the second vibrational energy transducer 904 from the second base station 915, wherein said two distinguishable second pair of signals are alternatively transmitted at known or agreed times of transmission from the second base station 915.

The signals transmitted from each base station 914 & 915 may optionally be coded to uniquely identify the base station 914 & 915 from other base stations 915 & 914-914N. As mentioned earlier, the two signals need not be identical but serve to carry similar information to the other side to assist in identifying the times of arrival and/or identifying the transmitter, etc. The two sets of signals need not have the same modulation technique, bandwidth, frequency, etc. A target receiving device 916, such as a tag on a device, person, etc. whose location needs to be tracked will receive two signals types from each of the base stations 914 & 915. A display device 918 is configured to receive locational data transmitted from the target receiving device 916 (hereinafter, "target device 916") as alternatively described in the flowcharts of the Figures. It is further understood that the target device 916 may comprise some or all of the aspects and elements of third system 500.

Referring now generally to the Figures and particularly to FIG. 9A through 9E, FIG. 9B is a block diagram of the target receiving device 916. The target device 916 comprises a target controller 916A communicatively coupled with a target real time clock 916B by means of a target communications and power bus 916C (hereinafter, "target bus" 916C). The target bus 916C further bi-directionally communicatively couples the target controller 916A with a target memory 916D, a target logic 916E, a target transceiver 916F, a target electromagnetic signal receiver 916G and a vibrational signal receiver 916H. An electrical energy power target device battery 916I is electrically coupled to and provides electrical energy via the target bus 916C to the target controller 916A, the target real time clock 916B, the target memory 916D, the target logic 916E, the target transceiver 916F, optionally to a target electromagnetic signal receiver 916G and optionally to the vibrational signal receiver 916H. It is understood that the target memory 916D and/or the hardwired target logic 916E in singularity of combination store and provide data, values, mathematical formulas, and instructions, e.g., a target software SW.1, sufficient to direct the target controller 916A to perform all optional and necessary aspects of the invented method required of the target device 916 as disclosed herein and particularly in FIGS. 12, 13 and 14 and accompanying text.

Referring now generally to the Figures and particularly to FIG. 9A through 9E, FIG. 9C is a block diagram of the first base station 914. The first base station 914 comprises a first base station controller 914A communicatively coupled with a first base station real time clock 914B by means of a first base station communications and power bus 914C (hereinafter, "first base station bus" 914C). The first base station bus 914C further bi-directionally communicatively couples the first base station controller 914A with a first base station memory 914D, a first base station logic 914E, a first base station transceiver 914F, the first vibrational energy transducer 902, and the first electromagnetic energy transducer 906. An electrical energy power first base station battery 914I is electrically coupled to and provides electrical energy via the first base station bus 914C to the first base station controller 914A, the first base station real time clock 914B, the first base station memory 914D, the first base station logic 914E, the first base station transceiver 914F, the first vibrational energy transducer 902, and the first electromagnetic energy transducer 906. It is understood that the first base station memory 914D and the hardwired first base station logic 914E in singularity of combination provide data, values, mathematical formulas, and instructions sufficient to direct the first base station controller 914A to perform all optional and necessary aspects of the invented method required of the first base station 914 as disclosed herein.

Referring now generally to the Figures and particularly to FIG. 9A through 9E, FIG. 9D is a block diagram of the second base station 915. The second base station 915 comprises a second base station controller 915A communicatively coupled with a second base station real time clock 915B by means of a second base station communications and power bus 915C (hereinafter, "second base station bus"

915C). The second base station bus 915C further bi-directionally communicatively couples the second base station controller 915A with a second base station memory 915D, a second base station logic 915E, a second base station transceiver 915F, the second vibrational energy transducer 904, and the second electromagnetic energy transducer 908. An electrical energy power second base station battery 915G is electrically coupled to and provides electrical energy via the second base station bus 915C to the second base station controller 915A, the second base station real time clock 915B, the second base station memory 915D, the second base station logic 915E, the second base station transceiver 915F, the second vibrational energy transducer 904, and the second electromagnetic energy transducer 908. It is understood that the second base station memory 915D and the hardwired second base station logic 915E in singularity of combination provide data, values, mathematical formulas, and instructions sufficient to direct the second base station controller 915A to perform all optional and necessary aspects of the invented method required of the second base station 915 as disclosed herein.

Referring now generally to the Figures and particularly to FIG. 9A through 9E, FIG. 9E is a block diagram of the display device 918. The display device 918 comprises a display device controller 918A communicatively coupled with a display device real time clock 918B by means of a display device communications and power bus 918C (hereinafter, "display device bus" 918C). The display device bus 918C further bi-directionally communicatively couples the display device controller 918A with a display device memory 918D, a display device logic 918E, and a display device transceiver 918F. An electrical energy power display device battery 918I is electrically coupled to and provides electrical energy via the display device bus 918C to the display device controller 918A, the display device real time clock 918B, the display device memory 918D, the display device logic 918E, the display device transceiver 918F and a display module 918G comprising a display screen 918H. It is understood that the display device memory 918D and the hardwired display device logic 918E in singularity or combination provide data, values TD1, TD2, X1, Y1, Z1, X2, Y2 & Z2, mathematical formulas FD.01, FD.02, FT.01, and instructions, e.g., a display device software SW.2 and a map rendering software SW.M, sufficient to direct the display device controller 918A to perform all optional and necessary aspects of the invented method required of the display device 918 as disclosed herein, to include rendering a map image and visually indicating a derived location of the target device 916.

Figure 10:
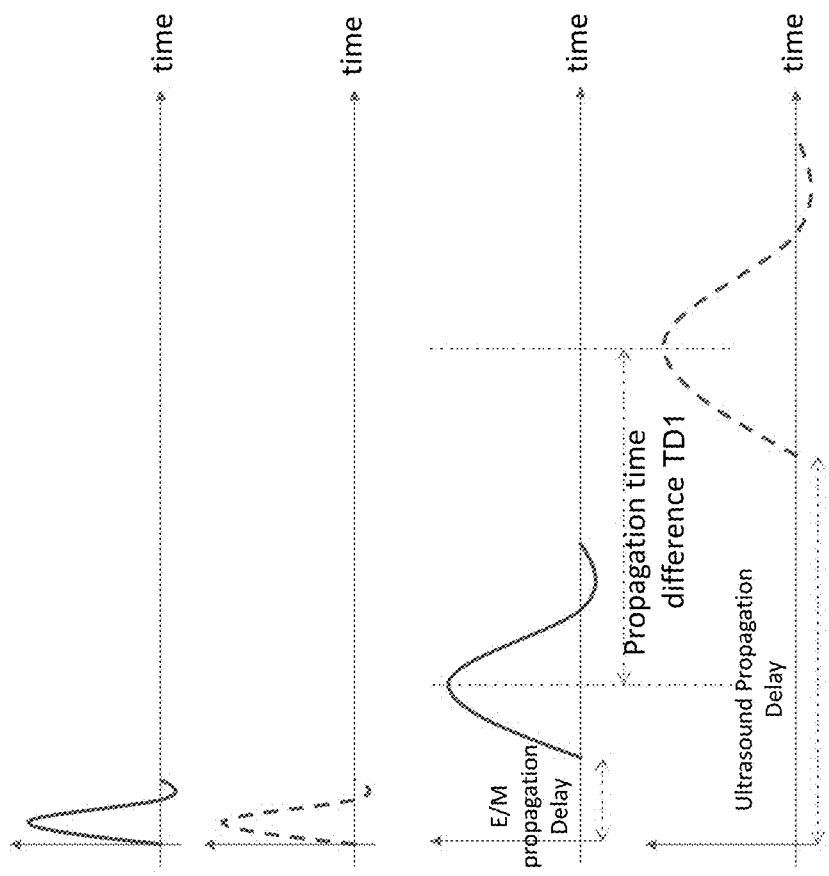
FIG. 10 is an illustration of energy signals of the elements of FIG. 10 of different frequencies and indicates varying rates of propagation and an optional time displacement in transmission of different signals and energy waves.
Figure 11:
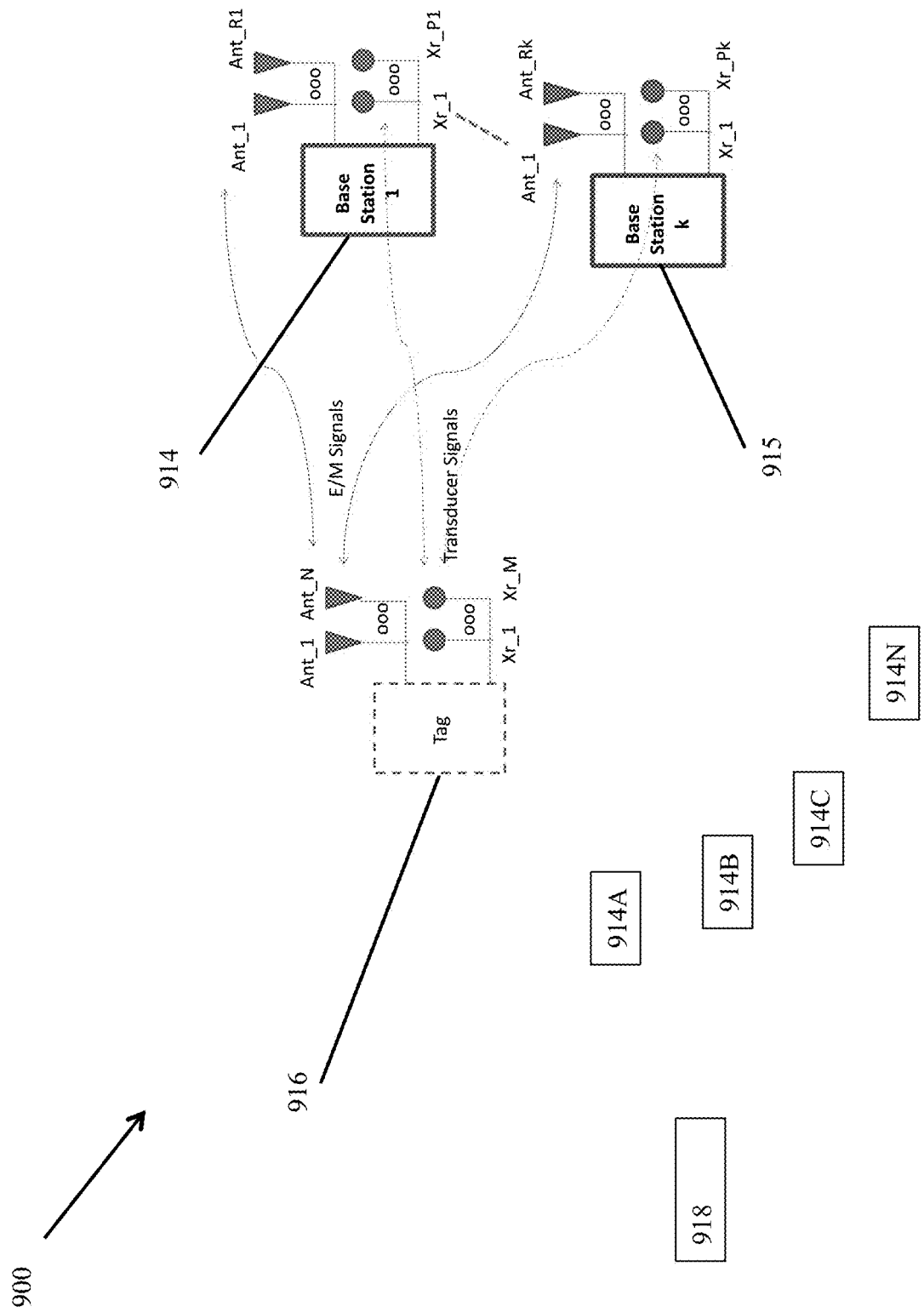
FIG. 11 is an a illustration of a sixth alternate embodiment of the present invention, wherein a plurality of emitter devices of known location each have at least two antennae tuned for a first energy type and at least two antennae tuned for a different energy type.

Referring now generally to the Figures and particularly to FIG. 10 and FIG. 11, FIG. 10 relies on the aspect of the invented method that effectively simultaneously transmits the signal(s) (or alternatively the known times of transmission) from the electromagnetic and piezo-electric sources and to equivalent receivers where it is received. Many methods can be devised to take advantage of this effective simultaneous transmission by at least the two media. Below is one simple yet effective method based on taking advantage of the difference of propagation delay of the said signals in their respective media. Since speed of electromagnetic and ultrasound in the medium (air in most cases) are very different, the two signals from the electromagnetic antenna and the piezo-electric transducer arrive at the target device 916 at different times as shown in FIG. 10. The receiver measures this time difference which directly indicates how far the target device 916 is from the said base station 915 & 914-914N. In this manner, a proximity estimator estimates how far the target device 916 user is from a base station 915 & 914-914N (which may be located on or near a desired location). An optional exemplary first time displacement TD1 is shown in FIG. 10 to indicate a measurement of an optional variance in origination times of transmission from a same base station 914 & 915 of two or more signals or energy waves.

Figure 9A:
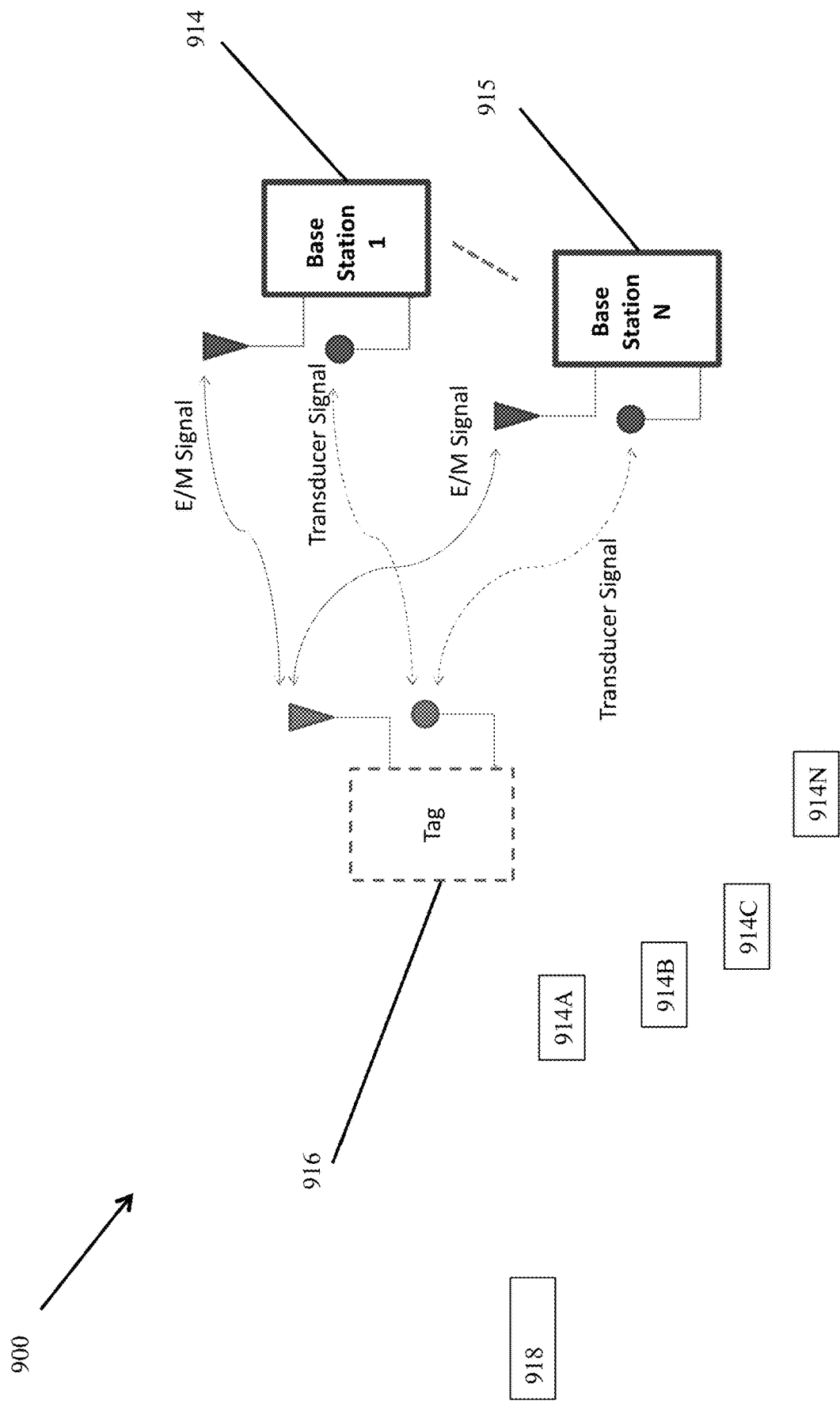
FIG. 9A is an illustration of a fifth alternate embodiment of the present invention, wherein a possible location of a target receiving device is derived in view of receipt time differences of energy waves of differing modes and propagation speeds as sourced from at least two differing locations.
Figure 9B:
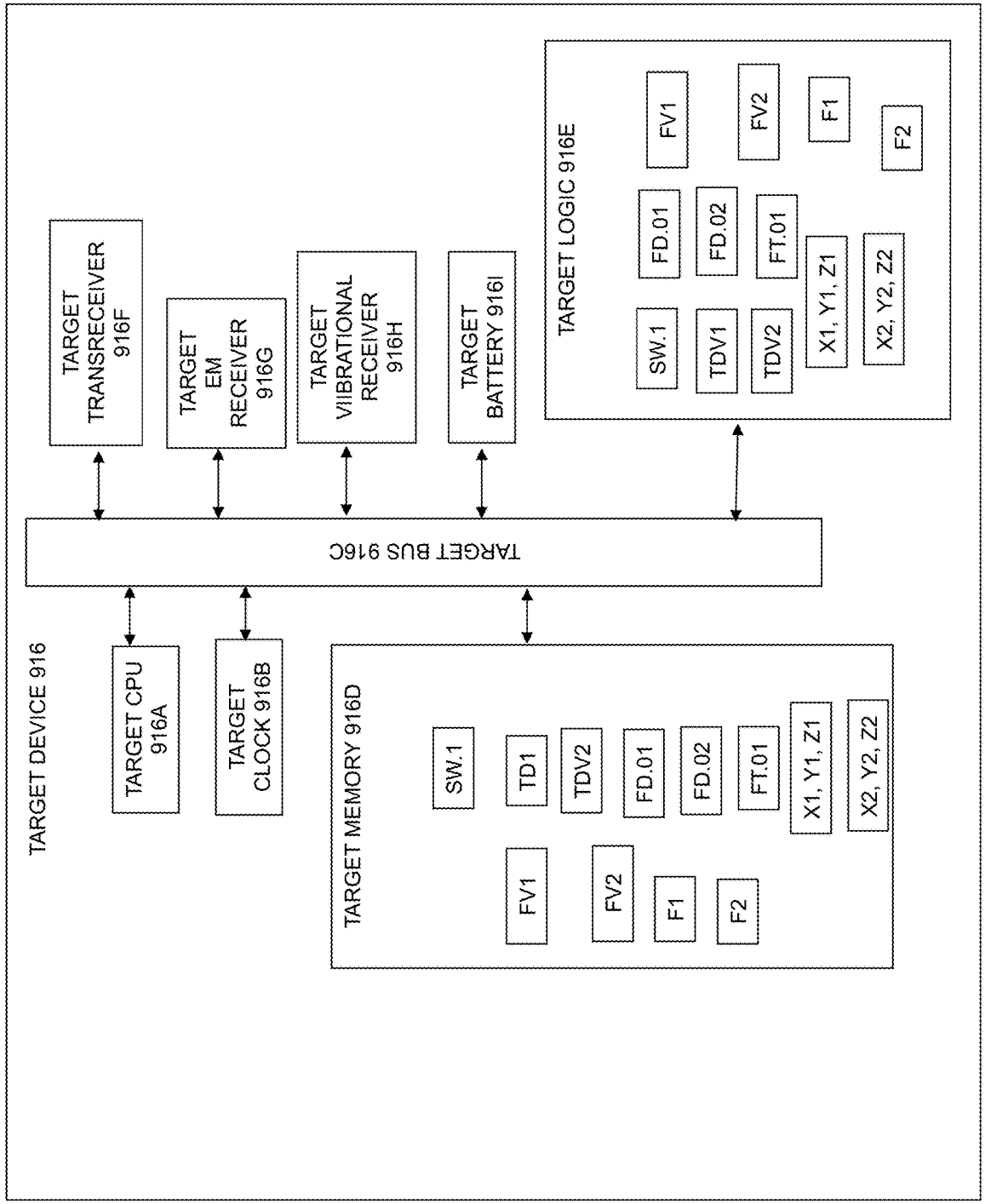
FIG. 9B is a block diagram of the target receiving device of FIG. 9A.
Figure 9C:
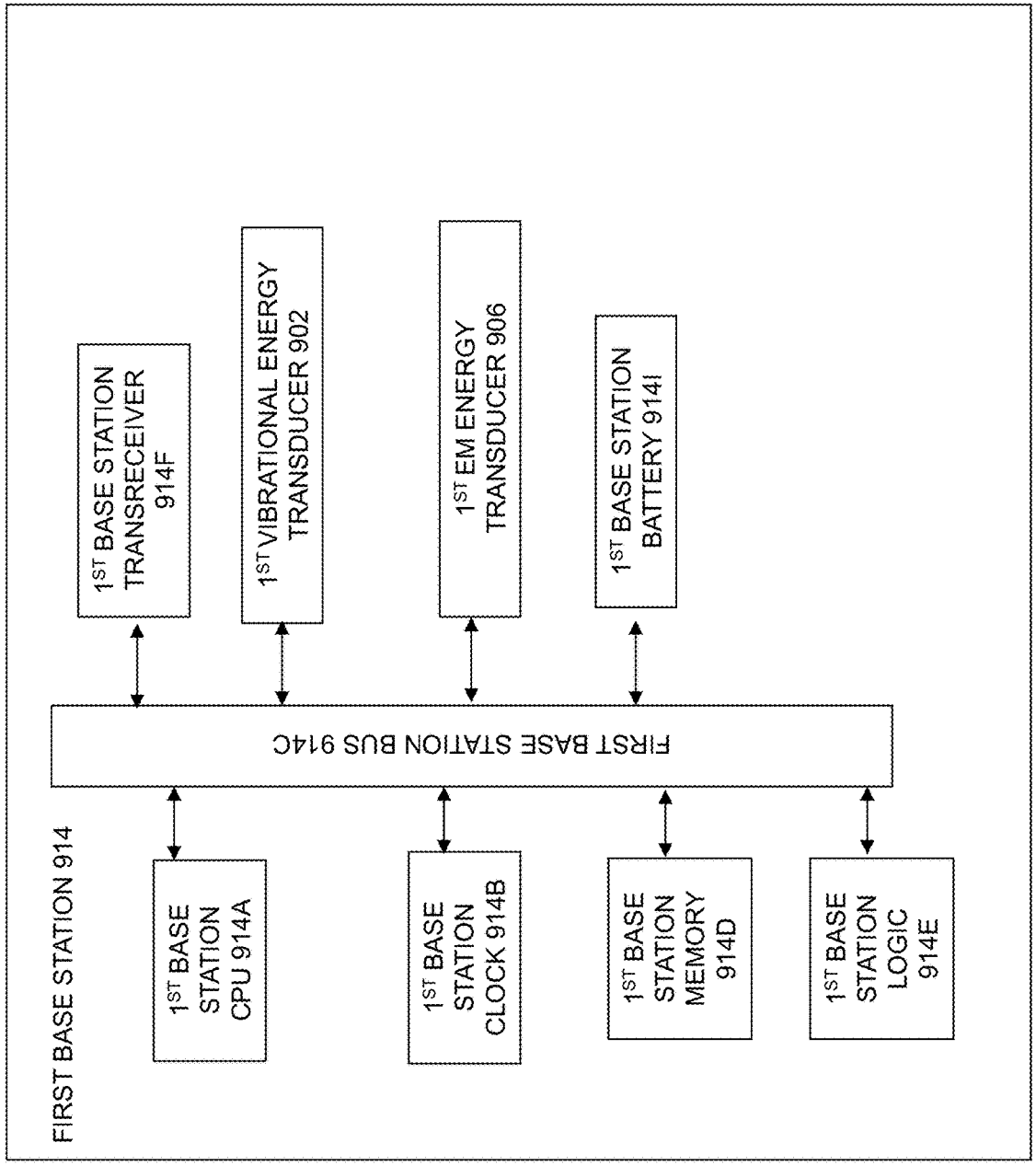
FIG. 9C is a block diagram of a first energy signal emitting device of FIG. 9A.
Figure 9D:
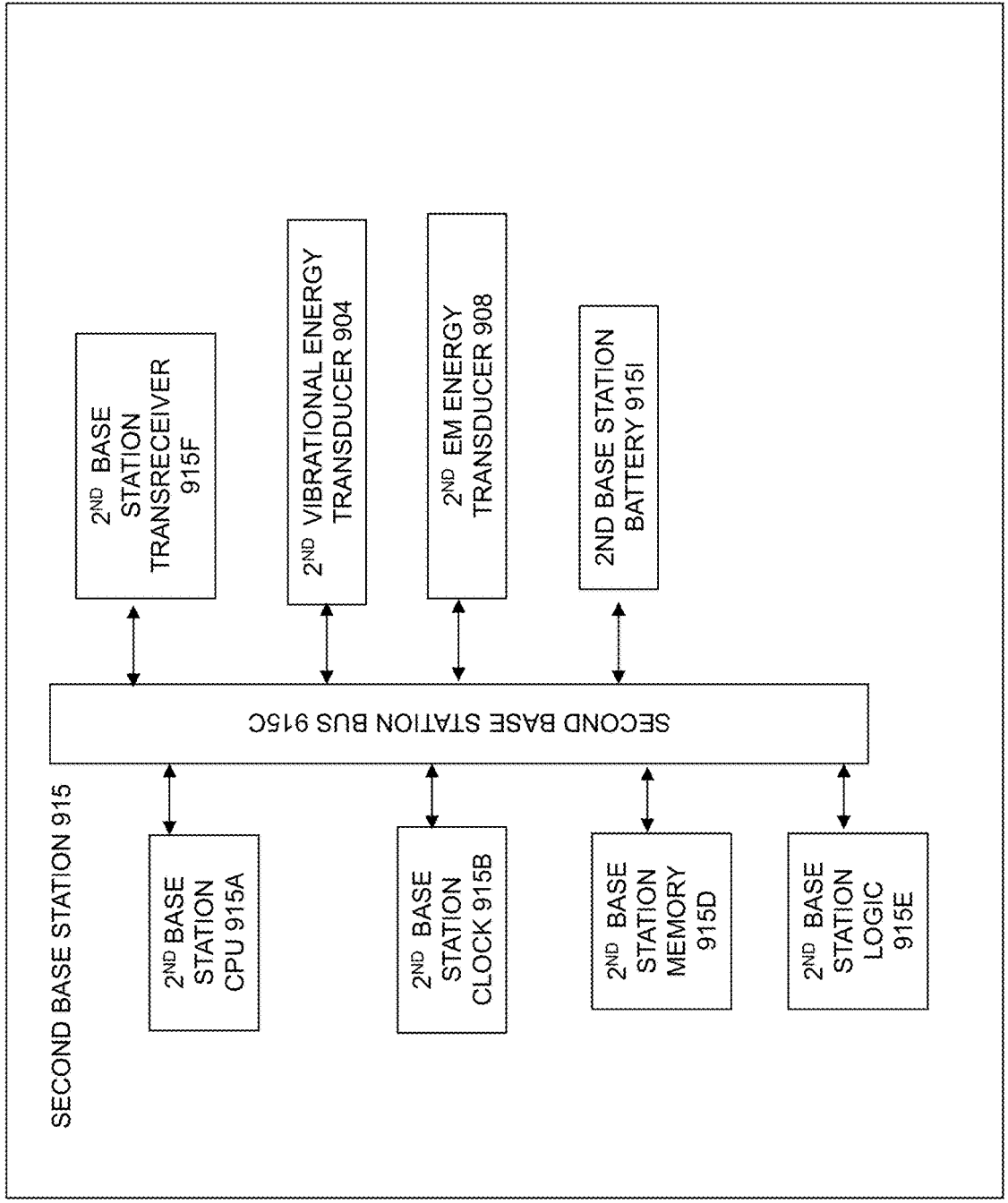
FIG. 9D is a block diagram of a second energy signal emitting device of FIG. 9A.
Figure 9E:
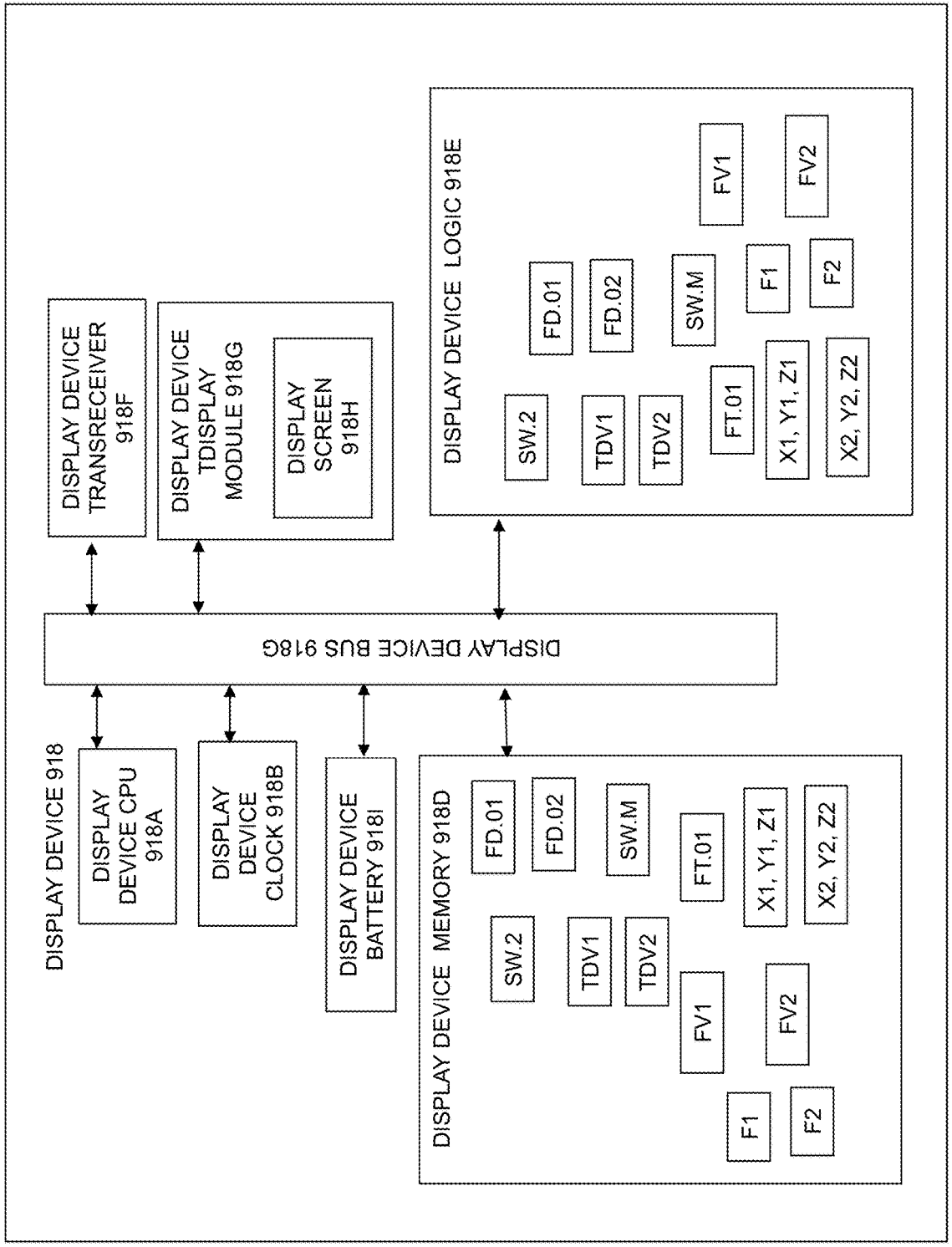
FIG. 9E is a block diagram of a display device of FIG. 9A.

Referring now generally to the Figures and particularly to FIG. 11, FIG. 11 discloses an alternate embodiment of the invented system of FIG. 9A wherein the number of base stations 915 & 914-914N is increased and is similarly equipped with two types of signal capabilities (electromagnetic and piezo-electric) in a general area of interest. Each base station 915 & 914-914N is optionally identifiable by their respective codes sent on the signals from their respective electromagnetic antenna and piezo-electric transducer sources (e.g., antennae and ultrasound transducers). The target device 916 receives each of these pairs of signals from each base station 915 & 914-914N and estimate the time difference of arrival between the two signal types from a particular same base station 915 & 914-914N.

As such, the target device 916 estimates how far it is from each base station 915 & 914-914N. Subsequently, by application of prior art geometrical trilateration techniques the target device 916 generates one or two sets of two dimensional x and y two dimensional Cartesian coordinates or optional two sets of three dimensional x, y, z Cartesian coordinates of its location in the area of interest. In two-dimensional geometry, it is known that if a point lies on two circles, then the circle centers and the two radii provide sufficient information to narrow the possible locations down to two. Additional information may narrow the possibilities down to one unique location. In three-dimensional geometry, when it is known that a point lies on the surfaces of three spheres, then the centers of the three spheres along with their radii provide sufficient information to narrow the possible locations down to no more than two, unless the centers lie on a straight line.

It is understood that this same technique can alternatively be applied backwards, in the sense that each receiving device 916 may transmit a signal from two sources, one electromagnetic and one piezo-electric (such as ultrasound). This signal can optionally be coded to uniquely identify the target device 916 from among other the receiving devices 916. One (in the case of proximity estimation) or more base stations 915 & 914-914N (in the case of geolocation estimation) can then pick up these signals and perform the same estimation as above to estimate the distance of the target device 916 from each of them (the base stations 915 & 914-914N). The said estimates from each base station 915 & 914-914N are communicated to the display device 918. The display device 918 then uses the estimates from the target device 916 to the base stations 915 & 914-914N to trilaterate, locating the target device 916 within the area of interest.

An important factor of the invented method is the effective simultaneous transmission, or a known time displacement of emission from a known location, of one or more signals with or without identifying codes and reception of them to estimate the location of target 916A-916N. The use of time difference of arrival of these different signals from the electromagnetic antenna(s) and the piezo-electric transducer(s) is just one method to implement this invention. In another instance, the electromagnetic signal and the piezo-electric transducer signals separately provide information to indicate, with any suitable technique known in the prior art, such as TDA or TDOA, etc. to estimate the distance from the target device 916 to the base stations 915 & 914-914N separately by each signal type, then the two different estimates are combined by any advantageous signal processing method, such as maximum ratio combining, etc., to arrive at a final and more advantageous estimate compared to each estimate separately. In any case above one or both signals may go through channel impairments causing the transmitted signals to be distorted and they may be distorted differently for the different media. In such cases proper prior art techniques rectify the distorted signals before estimation can and may be used.

It is also noted that in any case mentioned above that the electromagnetic and/or the piezo-electric signals can be emitted from and received by multiple antennae and/or piezo-electric transducers. In other words, either the transmission of one of the signals or both from either the base station(s) 915 & 914-914N, receiving device(s) 916A-916N or both may be performed through transceivers with multiple element antennae, transducers or both. An example representation of this is shown in FIG. 11.

Figure 12:
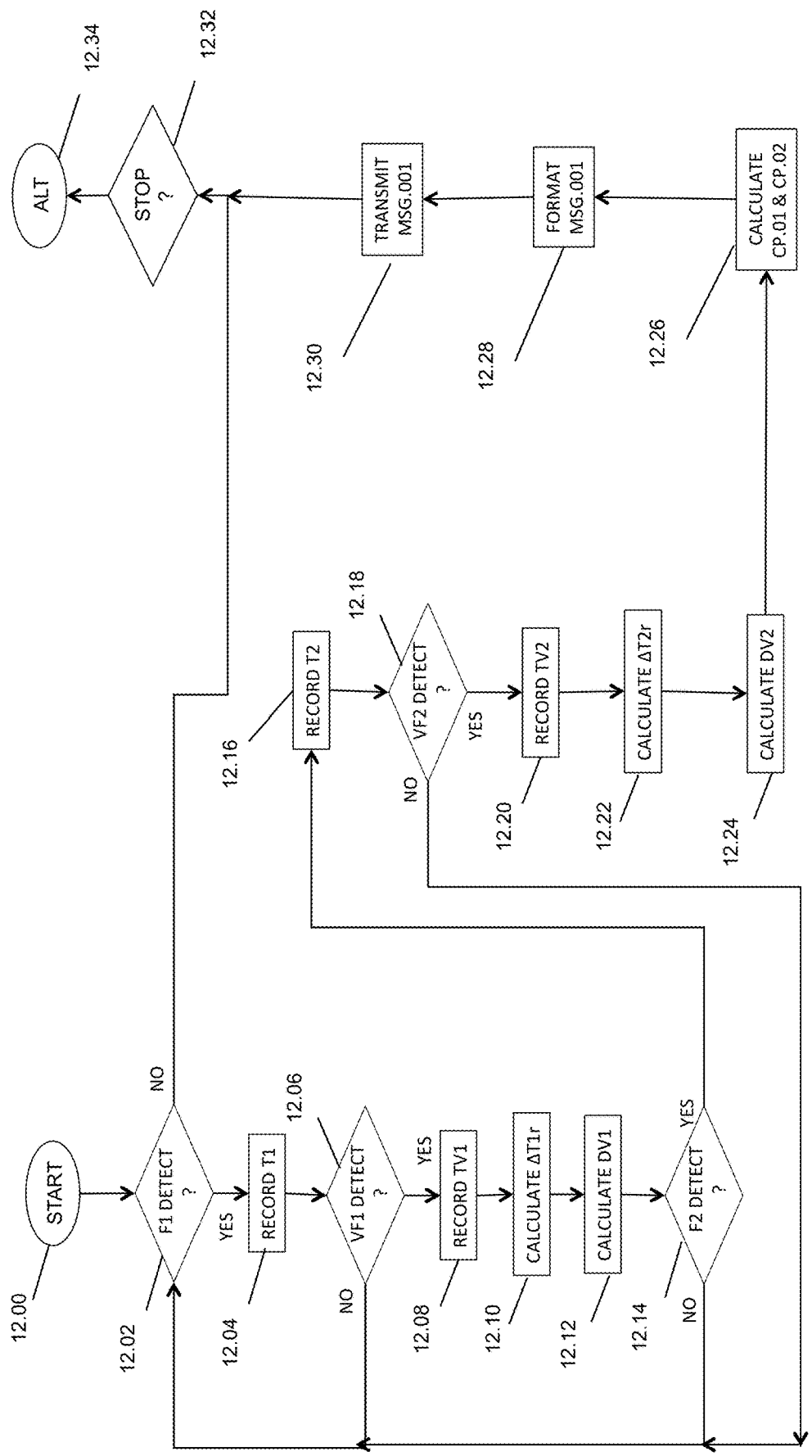
FIG. 12 is a flowchart describing both essential and optional operations of the target receiving device of FIG. 9A and FIG. 9B.

Referring now generally to the Figures and particularly to FIG. 12, FIG. 12 is a flowchart of operations of the invented method performed by the target device 916 as directed by the target software SW.1. In step 12.00 the target device 916 powers up and determines in step 12.02 if a first electromagnetic signal at a first radio wave frequency F1 has been detected. When the target device 916 determines in step 12.02 that a first electromagnetic signal at the first radio wave frequency F1 has been detected, the target device 916 records a first time value T1 in step 12.04. The target device 916 next determines in step 12.06 if a first vibrational signal at a first vibrational frequency FV1 has been detected. When the target device 916 determines in step 12.06 that the first vibrational signal at the first vibrational frequency FV1 has been detected, the target device 916 records a first vibrational signal time value TV1 in step 12.08. In step 12.10 the target device 916 calculates a first time displacement $\Delta T1$ by subtracting the first time value T1 from the first vibrational time value TV1 and further subtracts a first propagation time value $\Delta P1$ from the first time displacement $\Delta T1$ to derive a first resultant time displacement value $\Delta T1r$.

In step 12.12 the target device 916 applies a first distance formula FD.01 to the first resultant time displacement value $\Delta T1r$ to calculate a first distance value DV1 representative of a distance of the target device 916 from the first base station 914. As noted in the Summary of the Invention, sound waves travel in air at sea level in dry air at 20° C. (68° F.) at a speed of approximately 343 meters/second (wherein meters/second are hereinafter expressed as "m/s"), while electromagnetic waves travel at the speed of light of 300,000,000 m/s. Where an electromagnetic signal and a pressure wave signal are each emitted at approximately a same moment and approximately from a same location of origin at sea level and pass through dry air at 20° C. at 20 at one atmosphere pressure, a detection of different times of receipt of both the said electromagnetic signal and the said pressure wave signal at a target location distinct from the location of origin, an approximate the first distance value DV1 of the target location from the location of origin can be calculated. More particularly, when TV1=Time of receipt of pressure wave signal; and
T1=Time of receipt of electromagnetic signal;
$\Delta T1r$=TV1−T1; then
DV1 would approximately equal (TV1−T1)*343 m/s. Alternatively, the first distance value DV1 may be more accurately calculated as (TV1−T1)*(343 m/s)/(343 ms−3e8), or $\Delta T2r$)*(343 m/s)/(343 ms−3e8), given the assumptions stated above, wherein both of said signals travel from the same location of origin to said target location and said pressure wave signal travels at 343 m/s and said electromagnetic signal travels at 300,000,000 m/s. When there is a first displacement in time of origin of said electromagnetic signal and the said pressure wave signal is found to be equal to a first time displacement value TD1, then the first distance value DV1 may be alternatively approximated by either of the following formulas:

DV1=(TV1−T1+/−TD1)*343 m/s; or

DV1=(TV1−T1+/−TD1)*(343 m/s)/(343 ms−3e8).

The first distance formula FD.01 may follow the mathematical logic expressed above to calculate the first distance value DV1. It is understood that the target memory 916D and/or the hardwired target logic 916E in singularity of combination store and provide data, time displacement values TD1 & TD2, mathematical formulas FD.01 & FD.02, and instructions, e.g., the target software SW.1, sufficient to direct the target controller 916A to perform all optional and necessary aspects of the invented method required of the target device 916 as disclosed herein and particularly in FIGS. 12, 13 and 14 and accompanying text.

In step 12.14 the target device 916 determines if a second electromagnetic signal at a second radio wave frequency F2 has been detected. When the target device 916 determines in step 12.14 that a second electromagnetic signal at the second frequency F2 has been detected, the target device 916 records a second time value T2 in step 12.16. The target device 916 next determines in step 12.18 if a second vibrational signal at a second vibrational frequency FV2 has been detected. When the target device 916 determines in step 12.18 that the second vibrational signal at the second vibrational frequency FV2 has been detected, the target device 916 records a second vibrational signal time value TV2 in step 12.20. In step 12.22 the target device 916 calculates a second time displacement $\Delta T1$ by subtracting the second time value T2 from the second vibrational time value TV2 and further subtracts a second propagation time delay value $\Delta P2$ from the second time displacement $\Delta T2$ to derive a second resultant time displacement value $\Delta T2r$.

In step 12.24 the target device 916 applies a second distance formula FD.02 to the second resultant time displacement value $\Delta T2r$ to calculate a second distance value DV2 representative of a distance of the target device 916 from the second base station 915. More particularly, when TV2=Time of receipt of $2^{nd}$ pressure wave signal; and
T2=Time of receipt of $2^{nd}$ electromagnetic signal;
$\Delta T2r$=TV2−T2; then
DV2 would approximately equal (TV2−T2)*343 m/s or $\Delta T2r$*343 m/s. Alternatively, the second distance value DV2 may be more accurately calculated as (TV2−T2)*(343 m/s)/(343 ms−3e8), or ($\Delta T2r$)*(343 m/s)/(343 ms−3e8) given the assumptions stated above, wherein both of said signals travel from the same location of origin to said target location and said pressure wave signal travels at 343 m/s and said electromagnetic signal travels at 300,000,000 m/s. When there is a second displacement in time of origin of said second electromagnetic signal and the said second pressure wave signal is found to be equal to a second time displacement value TD2, then the second distance value DV2 may be alternatively approximated by either of the following formulas:

DV2=(TV2−T2+/−TD2)*343 m/s; or

DV2=(TV2−T2+/−TD2)*(343 m/s)/(343 ms−3e8).

The second distance formula FD.02 may follow the mathematical logic expressed above to calculate the second distance value DV2.

In step 12.26 the target device 916 applies a first trilateration formula FT.01 to the first distance value DV.01 and the second distance value DV.02, in view of both a first coordinates X1, Y1 & Z1 assigned to the first base station 914 and a second coordinates X2, Y2 & Z2 assigned to the second base station 915 and to generate a solution space of two solution coordinates CP.01 & CP.02, namely a first possible coordinates CP.01 and a second possible coordinates CP.02. The target device 916 formats a first location message MSG.001 in step 12.28 and populates the first location message MSG.001 with each of the two solution coordinates CP.01 & CP.02. In step 12.30 the target device 916 transmits the first location message MSG.001 to the display device 918.

It is understood that the display device 918 is preferably adapted, upon receipt of the first location message MSG.001, to visually render a representation of an environment surrounding the target device 916 and a visual indication of each of the locations respectively identified by one of the two solution coordinates CP.01 & CP.02 within the visual representation of the an environment surrounding the target device 916. This visual rendering of the display device is effected by the display module 918G exercising the display screen 918H.

It is understood that in a yet additional alternate preferred embodiment of the fifth system 900, that target device 916 may retain and apply three dimensional coordinates describing the locations of two or more base stations 915 & 914-914N whereby a second trilateration formula FT.02 may be applied to the first distance value DV.01, the second distance value DV.02 and a third distance value DV.03 to generate a single solution space of a singular coordinates CP.03, wherein the third distance value DV.03 is calculated in view of an identified location of a third base station 914A-914B from the target device 916 by the target device 916 applying a third distance formula FD.02 to a calculated third resultant time displacement value $\Delta T2r$ to representative of a distance of the target device 916 from the third base station 914A-914N in accordance with the method of steps 12.02 through 12.12 or steps 12.14 through 12.24.

The target device 916 proceeds from step 12.30, or from step 12.02, to step 12.32 and to determine whether to perform an additional execution of step 12.02 or to proceed on to perform alternate computational operations in step 12.34.

Figure 13:
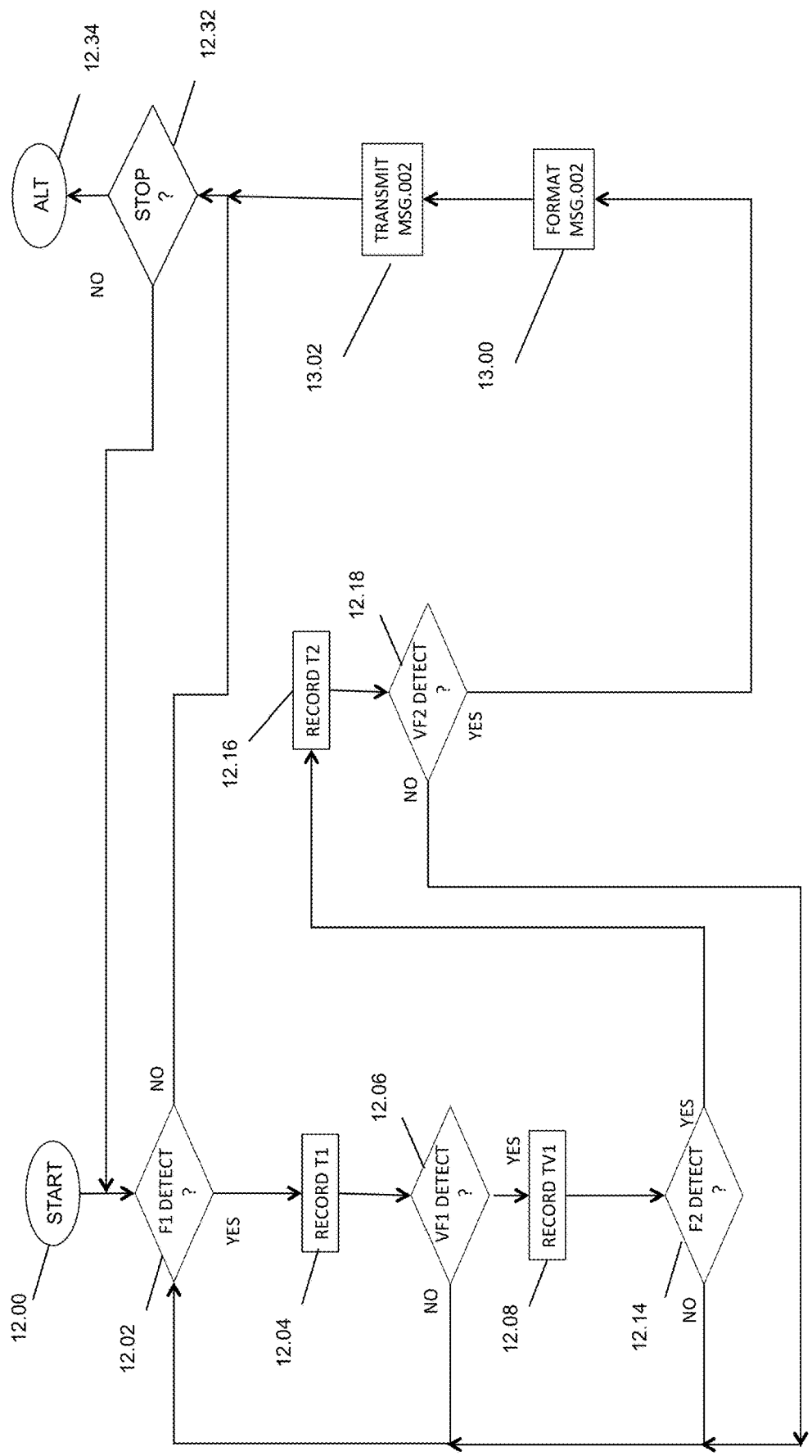
FIG. 13 is a flowchart describing optional operations of the target receiving device of FIG. 9A and FIG. 9B.

Referring now generally to the Figures and particularly FIG. 13, FIG. 13 is a flowchart of alternate operations of the invented method performed by the target device 916 as optionally or alternatively directed by the target software SW.1. In step 13.00 the target device 916 formats a second message MSG.002 of a second message type and populates the message with the four time detections values T1, TV1, T2 & TV2 as recorded respectively in steps 12.04, 12.08, 12.16, & 12.20 and optionally populates the second message MSG.002 with the first time displacement value TD1, the second time displacement value TD2, the first coordinates, X1, Y1, & Z1, the second coordinates X2, Y2 & Z2, and/or a network address of the display device 918 as a destination address of the second message. In step 13.02 the second message MSG.002 is transmitted from the target device 916 for reception by the display device 918.

Figure 14:
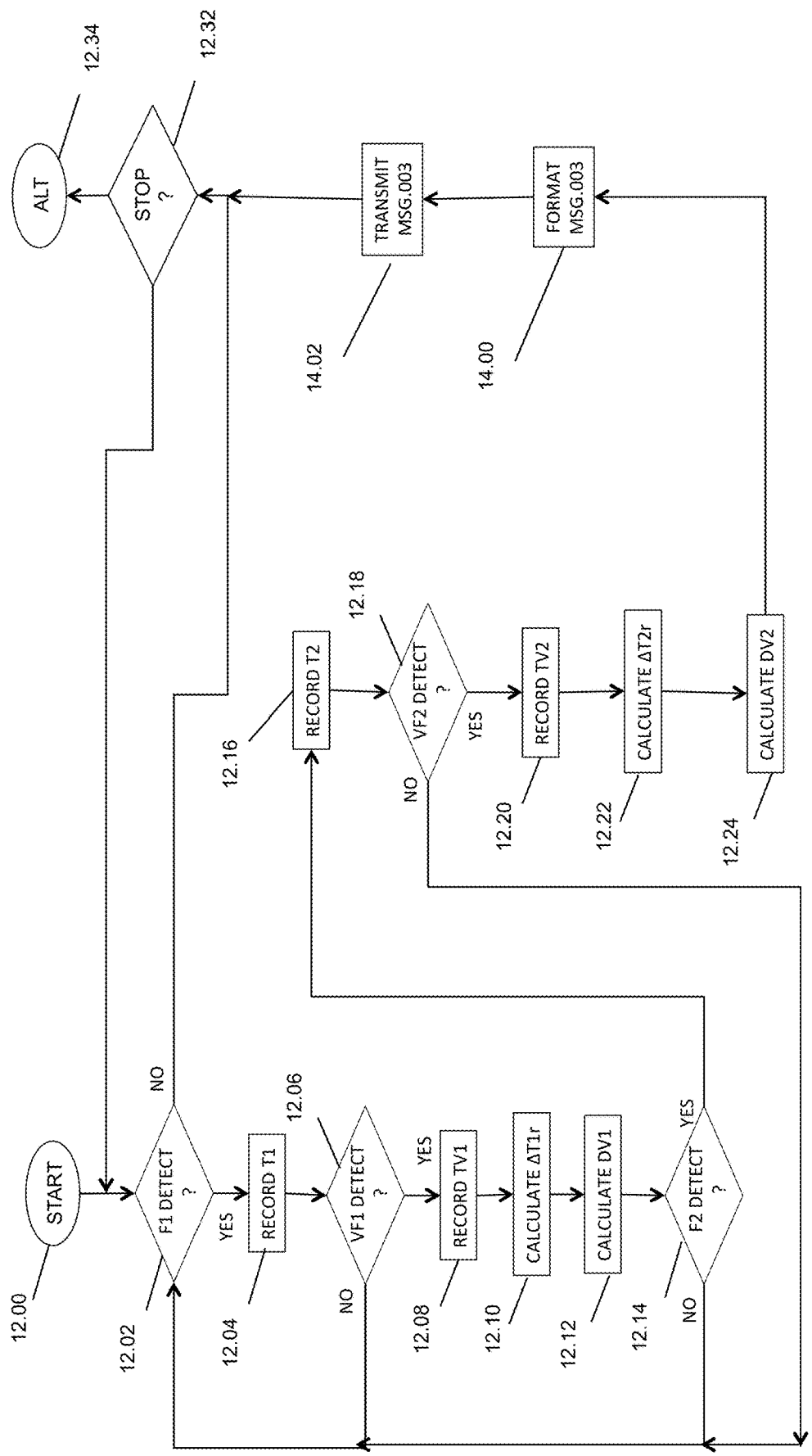
FIG. 14 is a flowchart describing yet additional optional operations of the target receiving device of FIG. 9A and FIG. 9B.

Referring now generally to the Figures and particularly FIG. 14, FIG. 14 is a flowchart of alternate operations of the invented method performed by the target device 916 as optionally or alternatively directed by the target software SW.1. In step 14.00 the target device 916 formats a third message MSG.003 of a third message type and populates the message with one or more of the following: (1.) the first resultant time displacement value $\Delta T1r$; (2.) the second resultant time displacement value $\Delta T2r$; (3.) the first distance value DV1; (4.) the second distance value DV2; (5.) the first coordinates, X1, Y1, & Z1; (6.) the second coordinates X2, Y2 & Z2, and/or (7.) a network address of the display device 918 as a destination address of the third message msg.003. In step 14.02 the third message MSG.003 is transmitted from the target device 916 for reception by the display device 918.

Figure 15:
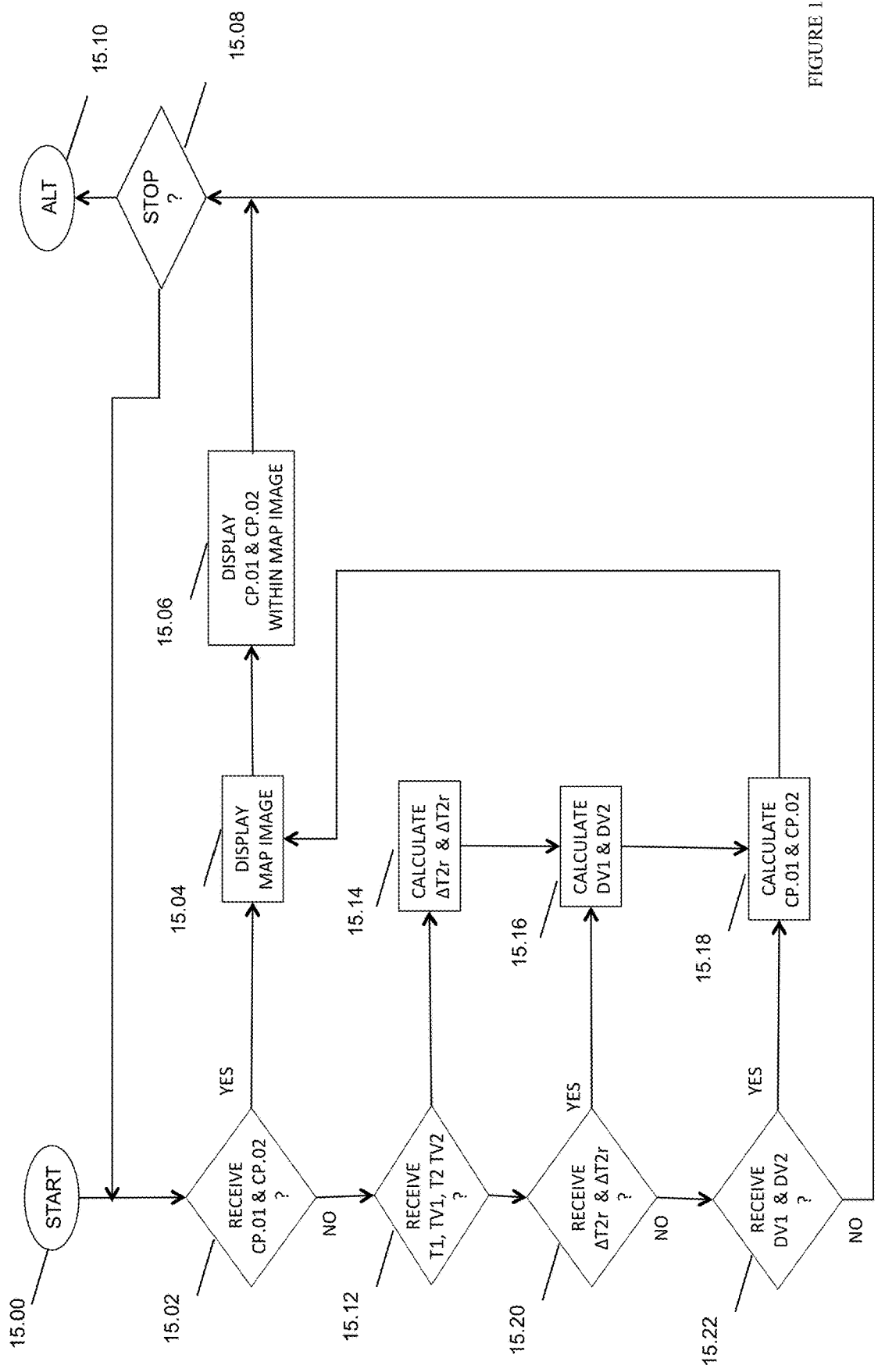
FIG. 15 is a flowchart describing both essential and optional operations of the display device of FIG. 9A and FIG. 9E.

Referring now generally to the Figures and particularly FIG. 15, FIG. 15 is a flowchart of alternate operations of the invented method performed by the display device 918 as optionally or alternatively directed by the display device software SW.2 and the map rendering software SW.M (hereinafter, "mapping software" SW.M). In step 15.00 the display device 918 powers up and in step 15.02 the display device 918 determines whether the first message MSG.001 has been received bearing the two solution coordinates CP.01 & CP.02. When the display device 918 determines in step 15.02 that first message MSG.001 has been received bearing the two solution coordinates CP.01 & CP.02, the display device 918 proceeds on to step 15.04 and employs the mapping software SW.M to render a map image via the display device display screen 918H, and in step 15.06 further employs the mapping software SW.M to render a visual indication of the two solution coordinates CP.01 & CP.02 within the rendered map image as presented in the display device display screen 918H. The display device 918 proceeds from step 15.06 to step 15.08 and to determine whether to perform an additional execution of step 15.02 or to proceed on to perform alternate computational operations in step 15.10.

In an alternative outcome to step 15.02, when the display device 918 determines in step 15.02 that the two solution coordinates CP.01 & CP.02 have not been received from the target device 916, the display device 918 proceeds on to step 15.12 and determines whether the reception time values T1, TV1, T2 & TV2 have been received from the target device 916. When the display device 918 determines in step 15.12 that the reception time values T1, TV1, T2 & TV2 have been received from the target device 916, the display device 918 proceeds (1.) on to step 15.14 calculate the time displacement values $\Delta T1r$ & $\Delta T2r$: (2.) and further on to step 15.16 to calculate the two distance values DV1 & DV2; and (3.) still further on to step 15.18 and to apply the trilateration formula FT.01 to the two-dimensional location coordinates X1, Y1, X2 & Y2 or optionally three-dimension coordinates X1, Y1, Z1, X2, Y2, & Z2 of the two or more base stations 914 & 915 with the two distance values DV1 & DV2 to calculate the two solution coordinates CP.01 & CP.02. The display device 918 proceeds from step 15.18 to step 15.04.

In applying the trilateration formula FT.01 where the X, Y coordinates of each of the base stations 914 & 915 are known, the intersections of the two circles that each circle respectively formed by the base stations 914 & 915 are calculated. With the assumption that any difference in an orthogonal height dimension Z between the distinguishable locations of the first base station 914 and the second base station 915, the first trilateration formula FT.01 may rely on the geometry of (1.) a first circle that is defined by applying the first distance value DV1 as a radius of a circle centered at the first base station coordinates X1 & Y1 of the location of the first base station 914; and (2.) a second circle that is defined by applying the second distance value DV2 as a second radius of a second circle centered at the second base station coordinates X2 & Y2 of the location of the second base station 915.

It is understood that the application of the first trilateration formula FT.01 will now be presented in clarifying example that is not offered as a limitation. Consider a geometrical representation of a relationship of the relative positions of the base stations 914 & 915 and the target device 916, wherein the first base station X value X1 is at an origin point (0,0) and the second base station X value X2 is a known positive displacement value D along the X axis; the first base station Y value Y1 is at the origin point (0,0) and the second base station Y value Y2 is at a zero displacement value along Y axis; and the target coordinates XT, YT of the target device are expressed as displacement values relative to the Cartesian coordinates X1 & Y1 of the first base station 914 that are expressed as the Cartesian coordinate origin (0,0). In other words, applying a geometry where:

X1=0;
Y1=0;
X2=D; and
Y2=0.

As the radius of the first circle is the first distance value DV1, the following formula applies to the first circle:

$$DV1^2 = X^2 + Y^2;\ \text{and}$$

As the radius of the second circle is the second distance value DV2, the following formula applies to the second circle:

$$DV2^2 = (X-D)^2 + Y.$$

The following equations are thus valid by Cartesian geometry:

$$DV1^2 - DV2^2 = X^2 + Y^2 - (X-D)^2 - Y^2$$

$$DV1^2 - DV2^2 = X^2 - (X-D)^2$$

$$DV1^2 - DV2^2 = X^2 - (X^2 - 2XD + D^2)$$

$$DV1^2 - DV12^2 = 2XD - D^2$$

$$DV1^2 - DV2^2 + D^2 = 2XD$$

$$X = (DV1^2 - DV2^2 + D^2)/2D;\ \text{or}$$

as X2=D:

$$X = (DV1^2 - DV2^2 + X2^2)/(2*X2)$$

It is understood that there will be two solutions to the above calculation for the target device X-axis coordinate XT of the target device 916 to the following formula:

$$XT = (DV1^2 - DV2^2 + X2^2)/2X2.$$

The target device Y-axis coordinate YT of the target device 916 to the following formulas:

$$DV1^2 = XT^2 + YT^2 = ((DV1^2 - DV2^2 + D^2)/2D)^2 + YT^2;$$

$$YT^2 = DV1^2 - ((DV1^2 - DV2^2 + D^2)/2D)^2;$$

$$YT = (DV1^2 - ((DV1^2 - DV1^2 + D^2)/2D)^2)^{1/2};\ \text{or}$$

as X2=D:

$$YT = (DV1^2 - ((DV1^2 - DV2^2 + X2^2)/(2*X2))^2)^{1/2}.$$

It is understood that there will be two solutions to the above calculation for the target device Y-axis coordinate YT of the target device 916.

In alternate preferred embodiments of the invented method, where the height dimension coordinates of the first base station 914, the second base station 915 and the target device 916 are respectively expressed as Z1, Z2 and Z3, an additional Cartesian coordinates (X4, Y4, Z4) location of an additional base station 914A may be applied to in addition to the first height coordinate Z1 of the first base station 914 and the first height coordinate Z2 of the second base station 915 to calculate the target device height coordinate Z3 by suitable computational means known in the art wherein the trilateration formula FT.01 is expanded to derive the three target Cartesian coordinates (X3, Y3, Z3) from the first station Cartesian coordinates (X1, Y1, Z1), the first distance value DV1, the second station Cartesian coordinates (X2, Y2, Z2), the second distance value DV2, known additional Cartesian coordinates (X4, Y4, Z4) of the additional base station 914A and an additional distance value DV3 of the additional base station 914A.

It is understood that the additional distance value DV3 could be calculated in accordance with the method of FIG. 12 and accompanying text. It is further understood that the additional base station 914A would comprise some or all of the aspects and elements of the first base station 914. It is understood that the Cartesian coordinates X1-X4, Y1-Y4 & Z1-Z4 may be expressed as coordinate values are understood by the principles of Euclidian geometry.

In an alternative outcome to step 15.12, when the display device 918 determines in step 15.12 that the reception time values T1, TV1, T2 & TV2 have not been received, the display device 918 proceeds on to step 15.20 and to determine whether calculate the time displacement values ΔT1r & ΔT2r have been received. When the display device 918 determines in step 15.20 that the time displacement values ΔT1r & ΔT2r have been received, the display device 918 proceeds on to step 15.16 and to calculate the two distance values DV1 & DV2.

In an alternative outcome to step 15.20, when the display device 918 determines in step 15.12 that the time displacement values ΔT1r & ΔT2r have not been received, the display device 918 proceeds on to step 15.22 and to determine whether calculate the distance values DV1 & DV2 have been received. When the display device 918 determines in step 15.22 that the distance values DV1 & DV2 have been received, the display device 918 proceeds on to step 15.18 and to apply the trilateration formula FT.01 to the base station location coordinates X1, Y1, Z1, X2, Y2, & Z2 with the two distance values DV1 & DV2 to calculate the two solution coordinates CP.01 & CP.02. The display device 918 proceeds from step 15.18 to step 15.04. In the alternative, when the display device 918 determines in step 15.22 that the distance values DV1 & DV2 have not been received, the display device 918 proceeds on to step 15.08.

The foregoing disclosures and statements are illustrative only of the Present Invention, and are not intended to limit or define the scope of the Present Invention. The above description is intended to be illustrative, and not restrictive. Although the examples given include many specificities, they are intended to be illustrative only of certain possible configurations, exemplary enabling methods or aspects of the Present Invention. The examples given should only be interpreted as illustrations of some of the preferred configurations or aspects of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

We claim:

1. A system comprising, comprising:
   a first emitter device comprising:
   a controller having a real time clock and adapted to generate and simultaneously provide at least two separate synchronized first trigger pulses through at least a first device first channel and a first device second channel;
   a first device vibrational energy emitter, the first device vibrational energy emitter coupled with the first device first channel, and the first device vibrational energy emitter adapted to transmit a first pressure wave energy signal upon receipt of a first trigger pulse; and
   a first device electromagnetic energy emitter, the first device electromagnetic energy emitter coupled with the first device second channel, and the first device electromagnetic emitter adapted to transmit a first electromagnetic wave energy signal upon receipt of the first trigger pulses;
   a second emitter device comprising:
   a second controller having a real time clock and adapted to generate and simultaneously provide at least two separate synchronized second trigger pulses through at least a second device first channel and a second device second channel;
   a second device vibrational energy emitter, the second device vibrational energy emitter coupled with the second device first channel, and the second device vibrational energy emitter adapted to transmit a second pressure wave energy emission upon receipt of a second trigger pulse; and
   a second device electromagnetic energy emitter, the second device electromagnetic energy emitter coupled with the second device second channel, and the second device electromagnetic emitter adapted to transmit a second electromagnetic wave energy signal upon receipt of the second trigger pulse;
   a receiving device, the receiving device comprising:
   a logic circuit comprising a real time clock and storing executable instructions;
   a pressure wave energy receiver coupled with the logic circuit and adapted to alert the logic circuit of a receipt of the first pressure wave energy signal and the second pressure wave energy signal;
   an electromagnetic signal receiver coupled with the logic circuit and adapted to alert the logic circuit of a receipt of the first electromagnetic wave energy signal and the second electromagnetic wave energy signal, whereby the instruction set directs the logic circuit to generate (1.) a first time delta value of a first time lapse detected between the first pressure wave energy signal and the first electromagnetic wave energy signal, and (2.) a second time delta value detected between the second pressure wave energy signal and the second electromagnetic wave energy signal; and
   a transmission means coupled with the logic circuit and adapted to transmit the first time delta value and the second time delta value by a wireless transmission modality, whereby the executable instructions stored by the logic circuit when executed by the receiving device cause the transmission means to transmit the first time delta value and the second time delta value.

2. The system of claim 1, wherein the executed instructions when executed by the receiving device direct the logic circuit to calculate a first emitter distance value from the first time delta value.

3. The system of claim 2, wherein the executed instructions when executed by the receiving device direct the logic circuit to calculate a second device distance value from the second time delta value.

4. The system of claim 3, wherein the executed instructions when executed by the receiving device direct the logic circuit to transmit the first emitter distance value and the second device distance value.

5. The system of claim 3, wherein the logic circuit further stores both a first location coordinate value of the first emitter device and a second location coordinate value of the second emitter device and the executed instructions when executed by the receiving device direct the logic circuit to calculate a receiving device coordinate value.

6. The system of claim 1, wherein the first electromagnetic wave energy signal, the second electromagnetic wave energy signal, the first pressure wave energy signal and the second pressure wave energy signal propagate to the receiving device via a same medium.

7. The system of claim 1, wherein the first electromagnetic wave energy signal and the second electromagnetic wave energy signal propagate to the receiving device via a second medium, and the first pressure wave energy signal and the second pressure wave energy signal propagate to the receiving device via a second medium.

8. The system of claim 1, wherein the logic circuit comprises a processor communicatively coupled with a memory circuit, and the executable instructions are stored in the memory.

9. The system of claim 1, wherein the logic circuit stores the executable instructions at least partly in a hardware logic configuration.

10. The system of claim 9, wherein the hardware logic configuration is comprised within a reconfigurable logic device.

11. The system of claim 9, wherein the hardware logic configuration is comprised within a programmable logic device.

12. The system of claim 9, wherein the hardware logic configuration is comprised within a reprogrammable logic device.

13. The system of claim 1, wherein the first device vibrational energy emitter comprises a first piezoelectric device and the first piezoelectric device emits the first pressure wave energy signal.

14. The system of claim 13, wherein the second device vibrational energy emitter comprises a second piezoelectric device and the second piezoelectric device emits the second pressure wave energy signal.

15. The system of claim 1, wherein the first device vibrational energy emitter comprises a first audio energy emitter and the first audio energy emitter generates the first pressure wave energy signal, wherein the first pressure wave energy signal includes a sound wave component.

16. The system of claim 15, wherein the second device vibrational energy emitter comprises a second audio energy emitter and the second audio energy emitter generates the second pressure wave energy signal, wherein the second pressure wave energy signal includes a sound energy component.

17. The system of claim 1, wherein the first electromagnetic wave energy comprises a first carrier wave frequency and the second electromagnetic wave energy comprises a second carrier wave frequency.

18. The system of claim 1, wherein the first electromagnetic wave energy comprises a first emitter device identifier information.

19. The system of claim 5, wherein the first electromagnetic wave energy signal comprises the first location coordinate value of the first emitter device and the receiving device is adapted to derive the first location coordinate value from the first electromagnetic wave energy signal.

20. The system of claim 1, wherein the second electromagnetic wave energy signal comprises the second location coordinate value of the second emitter device and the receiving device is adapted to derive the second location coordinate value from the second electromagnetic wave energy signal.

21. The system of claim 1, wherein the first time delta value is adjusted by a first time of generation displacement value, the first time of generation displacement value representing a first displacement of time formed by and between the transmission of the first pressure wave energy signal and the transmission of the first electromagnetic wave energy signal.

22. The system of claim 21, wherein the second time delta value is adjusted by a second time of generation displacement value, the second time of generation displacement value representing a second displacement of time formed by and between the transmission of the second pressure wave energy signal and the transmission of the second electromagnetic wave energy signal.

* * * * *